US012651180B2

(12) United States Patent
Egboga et al.

(10) Patent No.: US 12,651,180 B2
(45) Date of Patent: Jun. 9, 2026

(54) STATE PREDICTION RELIABILITY MODELING

(71) Applicant: SparkCognition, Inc., Austin, TX (US)

(72) Inventors: Nkem Egboga, Austin, TX (US); Abubakr Sheikh, Pflugerville, TX (US); Kevin Gullikson, Pflugerville, TX (US); James Robert Eskew, Austin, TX (US); Uche Ohafia, Austin, TX (US)

(73) Assignee: AVATHON, INC., Austin, TX (US)

( * ) Notice: Subject to any disclaimer, the term of this patent is extended or adjusted under 35 U.S.C. 154(b) by 819 days.

(21) Appl. No.: 17/823,379

(22) Filed: Aug. 30, 2022

(65) Prior Publication Data

US 2023/0078208 A1     Mar. 16, 2023

Related U.S. Application Data

(60) Provisional application No. 63/239,896, filed on Sep. 1, 2021.

(51) Int. Cl.
G06N 5/04 (2023.01)
G06N 5/022 (2023.01)

(52) U.S. Cl.
CPC .............. G06N 5/04 (2013.01); G06N 5/022 (2013.01)

(58) Field of Classification Search
CPC ............ G06N 5/046; G06N 5/04; G06N 5/02; G06N 5/022

USPC .......................................................... 706/12
See application file for complete search history.

(56) References Cited

U.S. PATENT DOCUMENTS

2016/0239754 A1* 8/2016 Dursun .................... G06N 7/01
2021/0176262 A1* 6/2021 Harris ................ G06Q 20/4016
2021/0216876 A1* 7/2021 McMenemy ........... G06F 30/27

OTHER PUBLICATIONS

Degeare, J. "Pipe Sticking," The Guide to Oilwell Fishing Operations, Chapter 5 (2003) (Second Edition), pp. 13-23.
Goodfellow, I., et al. "Deep Learning" (2016) Retrieved from https://www.deeplearningbook.org/.
Skalle, P., et al, "Detection of Symptoms for Revealing Causes Leading to Drilling Failures," SPE Drilling & Completion, vol. 28, Issue 2, Paper No. SPE-165931-PA, 2013, pp. 182-193.

* cited by examiner

*Primary Examiner* — Hung T Vy
(74) *Attorney, Agent, or Firm* — Moore IP Law

(57) ABSTRACT

A method includes providing behavior model input data to a behavior model to generate behavior model output data and generating an initial state prediction based on the behavior model output data. The method also includes, based on the initial state prediction indicating a particular state, generating state prediction statistics based on the initial state prediction and historical state predictions indicating the particular state. The method further includes providing classifier input data to a classifier model to generate a classification output indicating whether the initial state prediction is reliable. The classifier input data generated based on the state prediction statistics.

20 Claims, 10 Drawing Sheets

600

700

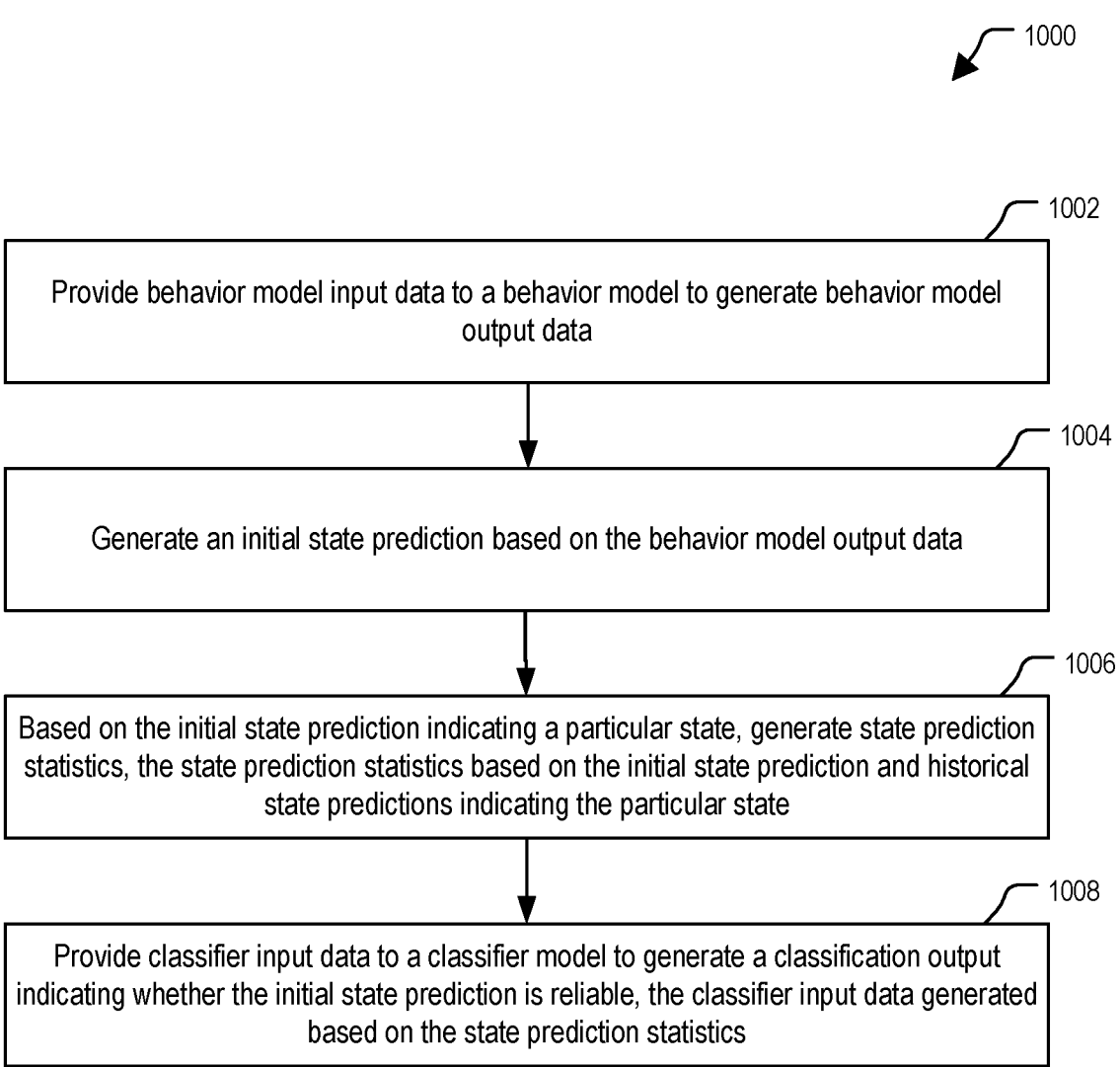

1000

1002

Provide behavior model input data to a behavior model to generate behavior model output data

1004

Generate an initial state prediction based on the behavior model output data

1006

Based on the initial state prediction indicating a particular state, generate state prediction statistics, the state prediction statistics based on the initial state prediction and historical state predictions indicating the particular state

1008

Provide classifier input data to a classifier model to generate a classification output indicating whether the initial state prediction is reliable, the classifier input data generated based on the state prediction statistics

FIG. 10

STATE PREDICTION RELIABILITY MODELING

CROSS-REFERENCE TO RELATED APPLICATION

The present application claims priority from U.S. Provisional Application No. 63/239,896 filed Sep. 1, 2021, entitled "STATE PREDICTION RELIABILITY MODELING," which is incorporated by reference herein in its entirety.

FIELD

The present disclosure is generally related to using trained models to generate a state prediction and to model the reliability of the state prediction.

BACKGROUND

Physics-based models and/or rules established by a subject matter expert can be used to monitor a monitored system in an attempt to detect onset of abnormal behavior of the monitored system. However, many systems experience "normal" fluctuations that are difficult for such models or rules to account for. For example, it can be difficult to accurately detect abnormal behavior exhibited by manually operated processes because person-to-person differences among operators can cause significant differences in sensor data from the monitored system even when the monitored system is exhibiting "normal" behavior. Additionally, it can be expensive and time consuming to establish and validate such models and/or rules. The time and expense involved is compounded if the monitored system has several normal operational states or if what behavior is considered normal changes from time to time. To illustrate, as equipment operates, the normal behavior of the equipment may change due to wear. It can be challenging to establish rules to monitor this type of gradual change in normal behavior. Further, in such situations, the equipment may occasionally undergo maintenance to offset the effects of the wear. Such maintenance can result in a sudden change in normal behavior, which is also challenging to monitor using established rules.

Further, significant benefit could be derived from early detection of the onset of abnormal behavior. For example, early detection of onset of abnormal behavior may allow a system operator to initiate operational changes that avoid the potential failures or equipment damage or to schedule resources needed to mitigate the duration, time, or cost associated with a period of abnormal behavior.

When detecting onset of abnormal behavior to avoid or mitigate downtime, false positives can increase costs or otherwise offset some of the benefit. For example, if an abnormal behavior detection scheme has a high false positive rate, actions to avoid or mitigate impacts of abnormal behavior will increase with no benefit (e.g., since no actual abnormal behavior is avoided or mitigated).

SUMMARY

The present disclosure describes systems and methods that use one or more first trained machine learning models to predict anomalous behavior of a monitored system or process and use one or more second models to estimate reliability of the anomalous behavior prediction. The first model(s) can be trained (e.g., in a supervised or unsupervised manner) to model normal behavior of the monitored system or process, as such, the first model(s) can be trained using available historical data and with little input from subject matter experts. The second model(s) can be trained (typically using supervised training techniques) to detect false positives, false negatives, or both, from the first model(s) based on historical state predictions, statistics representing historical and/or real-time data, or both.

In some aspects, a method includes providing behavior model input data to a behavior model to generate behavior model output data and generating an initial state prediction based on the behavior model output data. The method also includes, based on the initial state prediction indicating a particular state, generating state prediction statistics based on the initial state prediction and historical state predictions indicating the particular state. The method further includes providing classifier input data to a classifier model to generate a classification output indicating whether the initial state prediction is reliable. The classifier input data generated based on the state prediction statistics.

In some aspects, a device includes one or more processors configured to provide behavior model input data to a behavior model to generate behavior model output data. The one or more processors are also configured to generate an initial state prediction based on the behavior model output data. The one or more processors are further configured to, based on the initial state prediction indicating a particular state, generate state prediction statistics based on the initial state prediction and historical state predictions indicating the particular state. The one or more processors are also configured to provide classifier input data to a classifier model to generate a classification output indicating whether the initial state prediction is reliable. The classifier input data is generated based on the state prediction statistics.

In some aspects, a computer-readable storage device stores instructions. The instructions, when executed by one or more processors, cause the one or more processors to provide behavior model input data to a behavior model to generate behavior model output data. The instructions, when executed by one or more processors, also cause the one or more processors to generate an initial state prediction based on the behavior model output data. The instructions, when executed by one or more processors, further cause the one or more processors to, based on the initial state prediction indicating a particular state, generate state prediction statistics based on the initial state prediction and historical state predictions indicating the particular state. The instructions, when executed by one or more processors, also cause the one or more processors to provide classifier input data to a classifier model to generate a classification output indicating whether the initial state prediction is reliable. The classifier input data is generated based on the state prediction statistics.

BRIEF DESCRIPTION OF THE DRAWINGS

FIG. 10 is a flow chart of an example of a method in accordance with some examples of the present disclosure.

DETAILED DESCRIPTION

Figure 1:
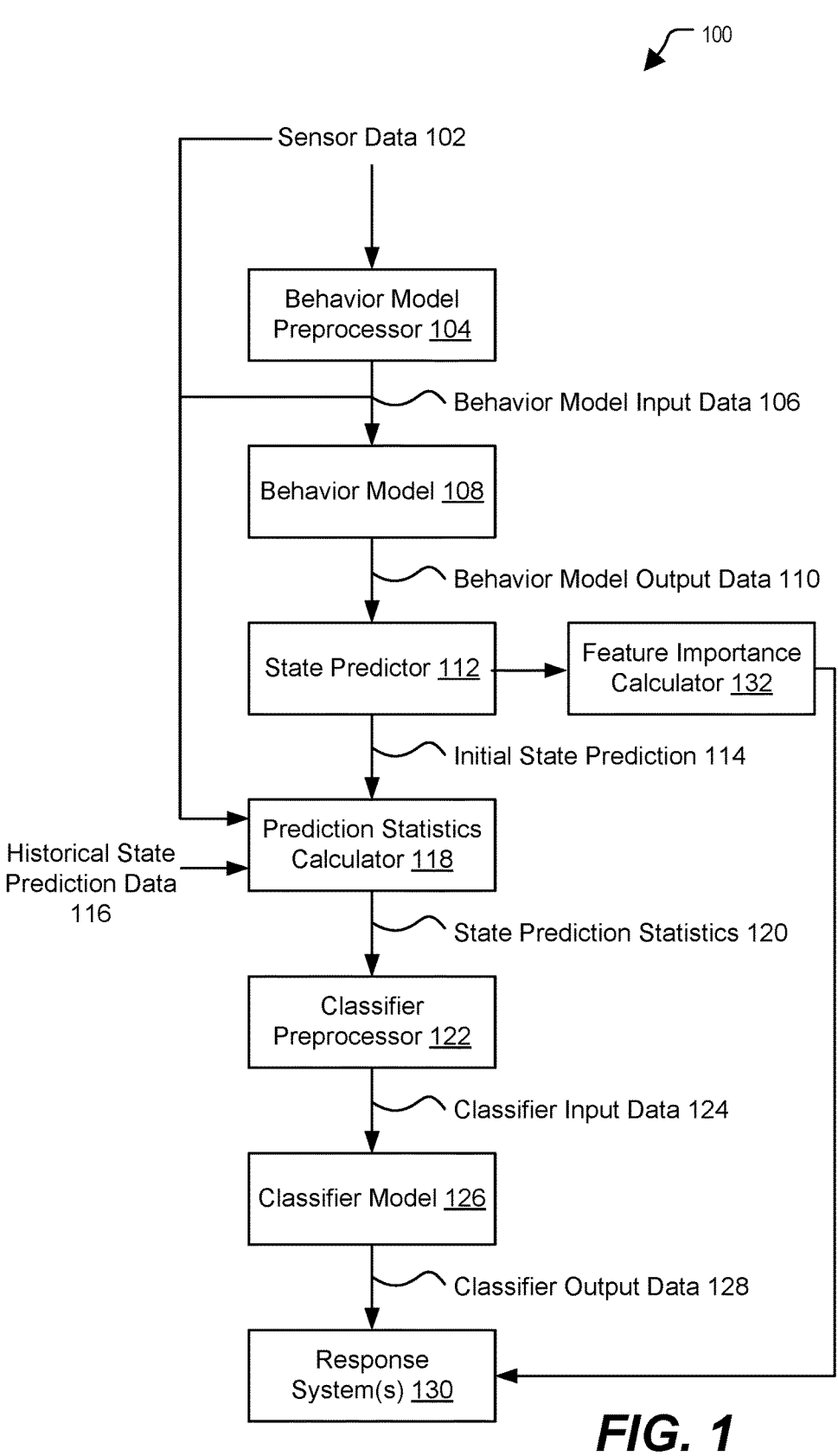
FIG. 1 is a diagram illustrating particular aspects of operations to generate a state prediction and to model the reliability of the state prediction in accordance with some examples of the present disclosure.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further the terms "comprise," "comprises," and "comprising" may be used interchangeably with "include," "includes," or "including." Additionally, the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining," "calculating," "estimating," "shifting," "adjusting," etc. may be used to describe how one or more operations are performed. Such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

As used herein, the term "machine learning" should be understood to have any of its usual and customary meanings within the fields of computers science and data science, such meanings including, for example, processes or techniques by which one or more computers can learn to perform some operation or function without being explicitly programmed to do so. As a typical example, machine learning can be used to enable one or more computers to analyze data to identify patterns in data and generate a result based on the analysis. For certain types of machine learning, the results that are generated include data that indicates an underlying structure or pattern of the data itself. Such techniques, for example, include so called "clustering" techniques, which identify clusters (e.g., groupings of data elements of the data).

For certain types of machine learning, the results that are generated include a data model (also referred to as a "machine-learning model" or simply a "model"). Typically, a model is generated using a first data set to facilitate analysis of a second data set. For example, a first portion of a large body of data may be used to generate a model that can be used to analyze the remaining portion of the large body of data. As another example, a set of historical data can be used to generate a model that can be used to analyze future data.

Since a model can be used to evaluate a set of data that is distinct from the data used to generate the model, the model can be viewed as a type of software (e.g., instructions, parameters, or both) that is automatically generated by the computer(s) during the machine learning process. As such, the model can be portable (e.g., can be generated at a first computer, and subsequently moved to a second computer for further training, for use, or both). Additionally, a model can be used in combination with one or more other models to perform a desired analysis. To illustrate, first data can be provided as input to a first model to generate first model output data, which can be provided (alone, with the first data, or with other data) as input to a second model to generate second model output data indicating a result of a desired analysis. Depending on the analysis and data involved, different combinations of models may be used to generate such results. In some examples, multiple models may provide model output that is input to a single model. In some examples, a single model provides model output to multiple models as input.

Examples of machine-learning models include, without limitation, perceptrons, neural networks, support vector machines, regression models, decision trees, Bayesian models, Boltzmann machines, adaptive neuro-fuzzy inference systems, as well as combinations, ensembles and variants of these and other types of models. Variants of neural networks include, for example and without limitation, prototypical networks, autoencoders, transformers, self-attention networks, convolutional neural networks, deep neural networks, deep belief networks, etc. Variants of decision trees include, for example and without limitation, random forests, boosted decision trees, etc.

Since machine-learning models are generated by computer(s) based on input data, machine-learning models can be discussed in terms of at least two distinct time windows—a creation/training phase and a runtime phase. During the creation/training phase, a model is created, trained, adapted, validated, or otherwise configured by the computer based on the input data (which in the creation/training phase, is generally referred to as "training data"). Note that the trained model corresponds to software that has been generated and/or refined during the creation/training phase to perform particular operations, such as classification, prediction, encoding, or other data analysis or data synthesis operations. During the runtime phase (or "inference" phase), the model is used to analyze input data to generate model output. The content of the model output depends on the type of model. For example, a model can be trained to perform classification tasks or regression tasks, as non-limiting examples. In some implementations, a model may be continuously, periodically, or occasionally updated, in which case training time and runtime may be interleaved or one version of the model can be used for inference while a copy is updated, after which the updated copy may be deployed for inference.

In some implementations, a previously generated model is trained (or re-trained) using a machine-learning technique. In this context, "training" refers to adapting the model or parameters of the model to a particular data set. Unless otherwise clear from the specific context, the term "training" as used herein includes "re-training" or refining a model for a specific data set. For example, training may include so called "transfer learning." As described further below, in transfer learning a base model may be trained using a generic or typical data set, and the base model may be subsequently refined (e.g., re-trained or further trained) using a more specific data set.

A data set used during training is referred to as a "training data set" or simply "training data". The data set may be labeled or unlabeled. "Labeled data" refers to data that has been assigned a categorical label indicating a group or category with which the data is associated, and "unlabeled data" refers to data that is not labeled. Typically, "supervised machine-learning processes" use labeled data to train a machine-learning model, and "unsupervised machine-learning processes" use unlabeled data to train a machine-learning model; however, it should be understood that a label associated with data is itself merely another data element that can be used in any appropriate machine-learning process. To illustrate, many clustering operations can operate using unlabeled data; however, such a clustering operation can use labeled data by ignoring labels assigned to data or by treating the labels the same as other data elements.

Machine-learning models can be initialized from scratch (e.g., by a user, such as a data scientist) or using a guided process (e.g., using a template or previously built model). Initializing the model includes specifying parameters and hyperparameters of the model. "Hyperparameters" are characteristics of a model that are not modified during training, and "parameters" of the model are characteristics of the model that are modified during training. The term "hyperparameters" may also be used to refer to parameters of the training process itself, such as a learning rate of the training process. In some examples, the hyperparameters of the model are specified based on the task the model is being created for, such as the type of data the model is to use, the goal of the model (e.g., classification, regression, anomaly detection), etc. The hyperparameters may also be specified based on other design goals associated with the model, such as a memory footprint limit, where and when the model is to be used, etc.

Model type and model architecture of a model illustrate a distinction between model generation and model training. The model type of a model, the model architecture of the model, or both, can be specified by a user or can be automatically determined by a computing device. However, neither the model type nor the model architecture of a particular model is changed during training of the particular model. Thus, the model type and model architecture are hyperparameters of the model and specifying the model type and model architecture is an aspect of model generation (rather than an aspect of model training). In this context, a "model type" refers to the specific type or sub-type of the machine-learning model. As noted above, examples of machine-learning model types include, without limitation, perceptrons, neural networks, support vector machines, regression models, decision trees, Bayesian models, Boltzmann machines, adaptive neuro-fuzzy inference systems, as well as combinations, ensembles and variants of these and other types of models. In this context, "model architecture" (or simply "architecture") refers to the number and arrangement of model components, such as nodes or layers, of a model, and which model components provide data to or receive data from other model components. As a non-limiting example, the architecture of a neural network may be specified in terms of nodes and links. To illustrate, a neural network architecture may specify the number of nodes in an input layer of the neural network, the number of hidden layers of the neural network, the number of nodes in each hidden layer, the number of nodes of an output layer, and which nodes are connected to other nodes (e.g., to provide input or receive output). As another non-limiting example, the architecture of a neural network may be specified in terms of layers. To illustrate, the neural network architecture may specify the number and arrangement of specific types of functional layers, such as long-short-term memory (LSTM) layers, fully connected (FC) layers, convolution layers, etc. While the architecture of a neural network implicitly or explicitly describes links between nodes or layers, the architecture does not specify link weights. Rather, link weights are parameters of a model (rather than hyperparameters of the model) and are modified during training of the model.

In many implementations, a data scientist selects the model type before training begins. However, in some implementations, a user may specify one or more goals (e.g., classification or regression), and automated tools may select one or more model types that are compatible with the specified goal(s). In such implementations, more than one model type may be selected, and one or more models of each selected model type can be generated and trained. A best performing model (based on specified criteria) can be selected from among the models representing the various model types. Note that in this process, no particular model type is specified in advance by the user, yet the models are trained according to their respective model types. Thus, the model type of any particular model does not change during training.

Similarly, in some implementations, the model architecture is specified in advance (e.g., by a data scientist); whereas in other implementations, a process that both generates and trains a model is used. Generating (or generating and training) the model using one or more machine-learning techniques is referred to herein as "automated model building". In one example of automated model building, an initial set of candidate models is selected or generated, and then one or more of the candidate models are trained and evaluated. In some implementations, after one or more rounds of changing hyperparameters and/or parameters of the candidate model(s), one or more of the candidate models may be selected for deployment (e.g., for use in a runtime phase).

Certain aspects of an automated model building process may be defined in advance (e.g., based on user settings, default values, or heuristic analysis of a training data set) and other aspects of the automated model building process may be determined using a randomized process. For example, the architectures of one or more models of the initial set of models can be determined randomly within predefined limits. As another example, a termination condition may be specified by the user or based on configurations settings. The termination condition indicates when the automated model building process should stop. To illustrate, a termination condition may indicate a maximum number of iterations of the automated model building process, in which case the automated model building process stops when an iteration counter reaches a specified value. As another illustrative example, a termination condition may indicate that the automated model building process should stop when a reliability metric associated with a particular model satisfies a threshold. As yet another illustrative example, a termination condition may indicate that the automated model building process should stop if a metric that indicates improvement of one or more models over time (e.g., between iterations) satisfies a threshold. In some implementations, multiple termination conditions, such as an iteration count condition, a time limit condition, and a rate of improvement condition can be specified, and the automated model building process can stop when one or more of these conditions is satisfied.

Another example of training a previously generated model is transfer learning. "Transfer learning" refers to initializing a model for a particular data set using a model that was trained using a different data set. For example, a "general purpose" model can be trained to detect anomalies in vibration data associated with a variety of types of rotary equipment, and the general-purpose model can be used as the starting point to train a model for one or more specific types of rotary equipment, such as a first model for generators and a second model for pumps. As another example, a general-purpose natural-language processing model can be trained using a large selection of natural-language text in one or more target languages. In this example, the general-purpose natural-language processing model can be used as a starting point to train one or more models for specific natural-language processing tasks, such as translation between two languages, question answering, or classifying the subject matter of documents. Often, transfer learning can converge to a useful model more quickly than building and training the model from scratch.

Training a model based on a training data set generally involves changing parameters of the model with a goal of causing the output of the model to have particular characteristics based on data input to the model. To distinguish from model generation operations, model training may be referred to herein as optimization or optimization training. In this context, "optimization" refers to improving a metric, and does not mean finding an ideal (e.g., global maximum or global minimum) value of the metric. Examples of optimization trainers include, without limitation, backpropagation trainers, derivative free optimizers (DFOs), and extreme learning machines (ELMs). As one example of training a model, during supervised training of a neural network, an input data sample is associated with a label. When the input data sample is provided to the model, the model generates output data, which is compared to the label associated with the input data sample to generate an error value. Parameters of the model are modified in an attempt to reduce (e.g., optimize) the error value. As another example of training a model, during unsupervised training of an autoencoder, a data sample is provided as input to the autoencoder, and the autoencoder reduces the dimensionality of the data sample (which is a lossy operation) and attempts to reconstruct the data sample as output data. In this example, the output data is compared to the input data sample to generate a reconstruction loss, and parameters of the autoencoder are modified in an attempt to reduce (e.g., optimize) the reconstruction loss.

As another example, to use supervised training to train a model to perform a classification task, each data element of a training data set may be labeled to indicate a category or categories to which the data element belongs. In this example, during the creation/training phase, data elements are input to the model being trained, and the model generates output indicating categories to which the model assigns the data elements. The category labels associated with the data elements are compared to the categories assigned by the model. The computer modifies the model until the model accurately and reliably (e.g., within some specified criteria) assigns the correct labels to the data elements. In this example, the model can subsequently be used (in a runtime phase) to receive unknown (e.g., unlabeled) data elements, and assign labels to the unknown data elements. In an unsupervised training scenario, the labels may be omitted. During the creation/training phase, model parameters may be tuned by the training algorithm in use such that during the runtime phase, the model is configured to determine which of multiple unlabeled "clusters" an input data sample is most likely to belong to.

As another example, to train a model to perform a regression task, during the creation/training phase, one or more data elements of the training data are input to the model being trained, and the model generates output indicating a predicted value of one or more other data elements of the training data. The predicted values of the training data are compared to corresponding actual values of the training data, and the computer modifies the model until the model accurately and reliably (e.g., within some specified criteria) predicts values of the training data. In this example, the model can subsequently be used (in a runtime phase) to receive data elements and predict values that have not been received. To illustrate, the model can analyze time series data, in which case, the model can predict one or more future values of the time series based on one or more prior values of the time series.

In some aspects, the output of a model can be subjected to further analysis operations to generate a desired result. To illustrate, in response to particular input data, a classification model (e.g., a model trained to perform classification tasks) may generate output including an array of classification scores, such as one score per classification category that the model is trained to assign. Each score is indicative of a likelihood (based on the model's analysis) that the particular input data should be assigned to the respective category. In this illustrative example, the output of the model may be subjected to a softmax operation to convert the output to a probability distribution indicating, for each category label, a probability that the input data should be assigned the corresponding label. In some implementations, the probability distribution may be further processed to generate a one-hot encoded array. In other examples, other operations that retain one or more category labels and a likelihood value associated with each of the one or more category labels can be used.

One example of a machine-learning model is an autoencoder. An autoencoder is a particular type of neural network that is trained to receive multivariate input data, to process at least a subset of the multivariate input data via one or more hidden layers, and to perform operations to reconstruct the multivariate input data using output of the hidden layers. If at least one hidden layer of an autoencoder includes fewer nodes than the input layer of the autoencoder, the autoencoder may be referred to herein as a dimensional reduction model. If each of the one or more hidden layer(s) of the autoencoder includes more nodes than the input layer of the autoencoder, the autoencoder may be referred to herein as a denoising model or a sparse model, as explained further below.

For dimensional reduction type autoencoders, the hidden layer with the fewest nodes is referred to as the latent space layer. Thus, a dimensional reduction autoencoder is trained to receive multivariate input data, to perform operations to dimensionally reduce the multivariate input data to generate latent space data in the latent space layer, and to perform operations to reconstruct the multivariate input data using the latent space data. "Dimensional reduction" in this context refers to representing n values of multivariate input data using z values (e.g., as latent space data), where n and z are integers and z is less than n. Often, in an autoencoder the z values of the latent space data are then dimensionally expanded to generate n values of output data. In some special cases, a dimensional reduction model may generate m values of output data, where m is an integer that is not equal to n. As used herein, such special cases are still referred to as autoencoders as long as the data values represented by the input data are a subset of the data values represented by the output data or the data values represented by the output data are a subset of the data values represented by the input data. For example, if the multivariate input data includes 10 sensor data values from 10 sensors, and the dimensional reduction model is trained to generate output data representing only 5 sensor data values corresponding to 5 of the 10 sensors, then the dimensional reduction model is referred to herein as an autoencoder. As another example, if the multivariate input data includes 10 sensor data values from 10 sensors, and the dimensional reduction model is trained to generate output data representing 10 sensor data values corresponding to the 10 sensors and to generate a variance value (or other statistical metric) for each of the sensor data values, then the dimensional reduction model is also referred to herein as an autoencoder (e.g., a variational autoencoder).

Denoising autoencoders and sparse autoencoders do not include a latent space layer to force changes in the input data. An autoencoder without a latent space layer could simply pass the input data, unchanged, to the output nodes resulting in a model with little utility. In some implementations, denoising autoencoders avoid this result by zeroing out a subset of values of an input data set while training the denoising autoencoder to reproduce the entire input data set at the output nodes. Put another way, the denoising autoencoder is trained to reproduce an entire input data sample based on input data that includes less than the entire input data sample. For example, during training of a denoising autoencoder that includes 10 nodes in the input layer and 10 nodes in the output layer, a single set of input data values includes 10 data values; however, only a subset of the 10 data values (e.g., between 2 and 9 data values) are provided to the input layer. The remaining data values are zeroed out. To illustrate, out of 10 data values, 7 data values may be provided to a respective 7 nodes of the input layer, and zero values may be provided to the other 3 nodes of the input layer. Fitness of the denoising autoencoder is evaluated based on how well the output layer reproduces all 10 data values of the set of input data values, and during training, parameters of the denoising autoencoder are modified over multiple iterations to improve its fitness.

Sparse autoencoders prevent passing the input data unchanged to the output nodes by selectively activating a subset of nodes of one or more of the hidden layers of the sparse autoencoder. For example, if a particular hidden layer has 10 nodes, only 3 nodes may be activated for particular data. The sparse autoencoder is trained such that which nodes are activated is data dependent. For example, for a first data sample, 3 nodes of the particular hidden layer may be activated, whereas for a second data sample, 5 nodes of the particular hidden layer may be activated.

One use case for autoencoders is detecting significant changes in data. For example, an autoencoder can be trained using training sensor data gathered while a monitored system is operating in a first operational mode. In this example, after the autoencoder is trained, real-time sensor data from the monitored system can be provided as input data to the autoencoder. If the real-time sensor data is sufficiently similar to the training sensor data, then the output of the autoencoder should be similar to the input data. Illustrated mathematically:

$$\widehat{x_k} - x_k \approx 0$$

where $\widehat{x_k}$ represents an output data value k and $x_k$ represents the input data value k. If the output of the autoencoder exactly reproduces the input, then $\widehat{x_k} - x_k = 0$ for each data value k. However, it is generally the case that the output of a well-trained autoencoder is not identical to the input. In such cases, $\widehat{x_k} - x_k = r_k$, where $r_k$ represents a residual value. Residual values that result when particular input data is provided to the autoencoder can be used to determine whether the input data is similar to training data used to train the autoencoder. For example, when the input data is similar to the training data, relatively small residual values should result. In contrast, when the input data is not similar to the training data, relatively large residual values should result. During runtime operation, residual values calculated based on output of the autoencoder can be used to determine the likelihood or risk that the input data differs significantly from the training data.

As one particular example, the input data can include multivariate sensor data representing operation of a monitored system. In this example, the autoencoder can be trained using training data gathered while the monitored system was operating in a first operational mode (e.g., a normal mode or some other mode). During use, real-time sensor data from the monitored system can be input to the autoencoder, and residual values can be determined based on differences between the real-time sensor data and output data from the autoencoder. If the monitored system transitions to a second operational mode (e.g., an abnormal mode, a second normal mode, or some other mode) statistical properties of the residual values (e.g., the mean or variance of the residual values over time) will change. Detection of such changes in the residual values can provide an early indication of changes associated with the monitored system. To illustrate, one use of the example above is early detection of abnormal operation of the monitored system. In this use case, the training data includes a variety of data samples representing one or more "normal" operating modes. During runtime, the input data to the autoencoder represents the current (e.g., real-time) sensor data values, and the residual values generated during runtime are used to detect early onset of an abnormal operating mode. In other use cases, autoencoders can be trained to detect changes between two or more different normal operating modes (in addition to, or instead of, detecting onset of abnormal operating modes).

FIG. 1 is a diagram 100 illustrating particular aspects of operations to generate a state prediction and to model the reliability of the state prediction in accordance with some examples of the present disclosure. The operations illustrated in FIG. 1 are performed by one or more processors, such as processor(s) of one or more server or cloud-based computing systems, one or more control systems, one or more desktop or laptop computers, one or more internet of things devices, etc. Data used by and generated by various of the operations are also illustrated in FIG. 1.

In FIG. 1, sensor data 102 is received and preprocessed at a preprocessor 104. The sensor data 102 includes raw time-series data, windowed or sampled time-series data, or other data representative of operation of one or more monitored assets. Non-limiting examples of the sensor data include a time series of temperature measurement values, a time series of vibration measurement values, a time series of voltage measurement values, a time series of amperage measurement values, a time series of rotation rate measurement values, a time series of mechanical load measurement values, a time series of torque measurement values, a time series of flow rate measurement values, a time series of position measurement values, a time series of pressure measurement values, a time series of frequency measurement values, a time series of packet loss rate values, a time series of data error values, measurements of other mechanical, electromechanical, electrical, or electronic metrics, or a combination thereof.

In a particular aspect, the sensor data 102 is multivariate data generated by multiple sensors of the same type or of different types. As an example of sensor data from multiple sensors of the same type, the sensor data 102 may include multiple time series of temperature values from temperature sensors associated with different locations of the monitored asset. As an example of sensor data from multiple sensors of different types, the sensor data 102 may include one or more time series of temperature values from one or more temperature sensors associated with the monitored asset and one or more time series of rotation rate values from one or more rotation sensors associated with the monitored assets.

The behavior model preprocessor 104 is configured to modify and/or supplement the sensor data 102 to generate preprocessed data as behavior model input data 106 for a behavior model 108. Operations performed by the behavior model preprocessor 104 may include, for example, filtering operations to remove outlying data samples, to reduce or limit bias (e.g., due to sensor drift or predictable variations), to remove sets of samples associated with particular events (such as data samples during a start-up period or during a known failure event), denoising, etc. In some implementations, the behavior model preprocessor 104 may also, or in the alternative, add to the sensor data 102, such as imputation to fill in estimated values for missing data samples or to equalize sampling rates of two or more sensors. In some implementations, the behavior model preprocessor 104 may also, or in the alternative, scale or normalize values of the sensor data 102. In some implementations, the behavior model preprocessor 104 may also, or in the alternative, determine new data values based on data value(s) in the sensor data 102. To illustrate, the sensor data 102 may include an analog representation of output of a sensor, and the preprocessor 104 may sample the analog representation and perform a time-domain to frequency-domain transformation (e.g., a Fast Fourier Transform) to generate a time series of frequency-domain values representing the output of the sensor. In some implementations, the behavior model preprocessor 104 determines statistics (e.g., sensor data value statistics) based on the sensor data 102. For example, the sensor data value statistics may include a change metric indicative of change of a sensor data value during a particular time interval. As another example, the sensor data value statistics may include an average of a sensor data value during a particular time interval. As yet another example, the sensor data value statistics may include a variation metric indicative of variation from an average sensor data value during a particular time interval. As still another example, the sensor data value statistics may include a maximum change of a sensor data value during a particular time interval. In some implementations, the sensor data value statistics are determined based on a plurality of distinct time scales. Additionally, or alternatively, the sensor data value statistics are determined based on a plurality of distinct scales that are not time-based, such as distinct windows applied to one set of sensor data values based on another set of sensor data values. To illustrate, a first sensor data value may indicate depth, and second sensor data values may indicate measurements taken at particular times, which correspond to particular depths. In this illustrative example, the second sensor data values may be windowed for statistical calculations based on depth. In some implementations, differences between sensor data values are used rather than, or in addition to, actual sensor data values to calculate any of the above examples of sensor data values statistics. For example, a mean torque can be calculated for a particular window, a mean change of torque between two windows can be calculated, or both.

The behavior model preprocessor 104 may also, or alternatively, format input data for the behavior model 108 based on the sensor data 102. For example, the behavior model input data 106 may include an array of data values of the sensor data 102 and/or data values derived from the sensor data 102 via various preprocessing operations. To illustrate, in a particular implementation, each row of the array of data values represents a time step (or other windowing increment) and each column of the array of values represents a particular value included in or derived from the sensor data 102. To illustrate, the behavior model input data 106 may be based on a particular time window of multivariate time series data derived from the sensor data 102.

The behavior model 108 is trained to generate behavior model output data 110 based on the behavior model input data 106. The behavior model 108 includes or corresponds to a dimensional reduction model, an autoencoder, a time series predictor, a feature predictor, or another machine-learning model, as described further with reference to FIG. 3.

In one example, the behavior model 108 includes an autoencoder that is trained to encode the behavior model input data 106 into an encoded representation and to decode the encoded representation to generate the behavior model output data 110. In this example, the behavior model output data 110 represents an attempt to recover the behavior model input data 106, and a difference between a particular behavior model input data sample and a corresponding behavior model output data sample is a residual value used to generate an initial state prediction 114.

In another example, the behavior model 108 includes a time series predictor that is trained to predict a next value of a time series. To illustrate, the behavior model input data 106 provided to the time series predictor may include current sensor data values associated with one or more sensors, and the time series predictor may generate the behavior model output data 110 indicating one or more predicted future values of the sensor data associated with the one or more sensors. In this example, a difference between one or more predicted future values of the sensor data and the corresponding actual values of the sensor data (received later in the time series) is a residual value used to generate the initial state prediction 114.

In another example, the behavior model 108 includes a feature predictor that is trained to predict a value of one or more sensor data values based on one or more other sensor data values. To illustrate, the behavior model input data 106 may include a temperature value from a temperature sensor, a rotation rate value from a rotation rate sensor, and a vibration value from a vibration sensor. In this illustrative example, the temperature value and the rotation rate value may be provided as input to the feature predictor, and the feature predictor may generate the behavior model output data 110 indicating a predicted vibration value. In this example, a difference between the predicted vibration value and the actual value as indicated in the preprocessed data is a residual value used to generate the initial state prediction 114.

As explained below, the behavior model 108 is trained using data representing normal operation of a monitored asset (or operation associated with a particular operational mode). The residual data described above are indicative of how well the behavior model 108 is able to represent operation of the monitored asset as indicated by the sensor data 102. Thus, the behavior model 108 is tuned or trained to accurately (as indicated by a small residual) represent operation of the monitored asset during normal operation of the monitored asset. When the behavior model input data 106 includes data representing abnormal or anomalous behavior, the behavior model 108 is not able to accurately represent operation of the monitored asset, and as a result, one or more residual values increase.

In a particular aspect, the behavior model 108 is trained based on relationships (which may be nonlinear) between variables of training data. When the relationships between variables are similar in the training data set and the behavior model input data 106, the residual values will be small. In contrast, the residual values will be large when at least one feature is poorly reconstructed. This situation is likely to occur when the relationship of that feature with other features of the behavior model input data 106 has changed relative to the training data set.

In the example illustrated in FIG. 1, a state predictor 112 calculates the residual values based on the behavior model output data 110 and generates the initial state prediction 114. In a particular implementation, the state predictor 112 uses one or more thresholds, heuristics, or models to determine whether the residual values are indicative of current or future abnormal behavior of the monitored asset. For example, one or more residual values that are greater than a threshold value may indicate that the monitored asset is tending toward abnormal behavior. As another example, a trend of residual values (e.g., an L2-norm of a rolling mean of one or more of the residual values or a rolling mean of an L2-norm of one or more of the residual values) may be compared to a fixed or dynamic threshold (e.g., a statistical threshold) to determine whether the monitored asset is tending toward abnormal behavior.

In some implementations, the state predictor 112 determines a risk index value based on the residual values. In some such implementations, the state predictor 112 uses the risk index values to determine the initial state prediction 114. For example, the state predictor 112 may use a sequential probability ratio test (SPRT) to determine, based on the risk index values, whether the sensor data 102 for a particular time step (or other sample window) is indicative of abnormal operation of the monitored assets. If the state predictor 112 determines that the sensor data 102 is indicative of current or future abnormal (or anomalous) behavior of the monitored asset, the initial state prediction 114 includes a value indicating abnormal (or anomalous) behavior. If the state predictor 112 does not determine that the sensor data 102 is indicative of current or future abnormal behavior of the monitored asset, the initial state prediction 114 includes a value indicating normal behavior.

In a particular implementation, the initial state prediction 114 is checked using a classifier model 126. The following description relates to an implementation in which the initial state prediction 114 is checked when the initial state prediction 114 indicates abnormal behavior of the monitored asset. In this implementation, the classifier model 126 is trained to reduce a false positive rate associated with initial state predictions indicating abnormal behavior (i.e., when the sensor data is indicative of normal behavior but the initial state prediction 114 indicates abnormal behavior). In other implementations, the initial state prediction 114 is checked when the initial state prediction 114 indicates normal behavior of the monitored asset. In such implementations, the classifier model 126 is trained to reduce a false negative rate associated with the initial state prediction 114 indicating abnormal behavior (i.e., when the sensor data is indicative of abnormal behavior but the initial state prediction 114 indicates normal behavior). In still other implementations, the initial state prediction 114 is checked irrespective of whether the initial state prediction 114 indicates normal or abnormal behavior of the monitored asset.

In some implementations, the classifier model 126 determines whether the initial state prediction is associated with a particular type of abnormal behavior. For example, drilling operations may be subject to multiple failure mode, such as stuck pipe, tight hole, lost circulation, formation drainage, etc. In this example, the classifier model 126 may indicate whether the initial state prediction is indicative of onset of a stuck pipe condition (or another of the potential failure modes of the drilling operation).

In a particular aspect, the classifier model 126 is configured to receive classifier input data 124 that is based on the sensor data 102, the behavior model input data 106, the initial state prediction 114, historical state prediction data 116, or a combination thereof. To illustrate, a prediction statistic calculator 118 may generate state prediction statistics 120. In some implementations, the state prediction statistics 120 are not generated when the initial state prediction 114 indicates normal behavior.

In some implementations, the state prediction statistics 120 indicate a duration of a period in which the initial state prediction indicates an alert condition (e.g., abnormal behavior). In some implementations, the state prediction statistics 120 include an average risk score value during a period in which the initial state prediction indicates an alert condition (e.g., abnormal behavior). In some implementations, the state prediction statistics 120 include a metric indicating variation of a risk score from an average risk score value during a period in which the initial state prediction indicates an alert condition (e.g., abnormal behavior). In some implementations, the state prediction statistics 120 include a metric indicating a quantile value of a risk score during a period in which the initial state prediction indicates an alert condition. In some implementations, the state prediction statistics 120 include a metric indicating a rate of change of a risk score during a period in which the initial state prediction indicates an alert condition. In some implementations, the state prediction statistics 120 include a metric indicating a number of prior alert conditions during a specified time window preceding a period in which the initial state prediction indicates an alert condition. In some implementations, the state prediction statistics 120 include a metric indicating an average risk score value during a specified time window preceding a period in which the initial state prediction indicates an alert condition. In some implementations, the state prediction statistics 120 include a metric indicating variation of a risk score from an average risk score value during a specified time window preceding a period in which the initial state prediction indicates an alert condition. In some implementations, the state prediction statistics 120 include a metric indicating a rate of change of a risk score during a specified time window preceding a period in which the initial state prediction indicates an alert condition. In implementations that use a risk score, the risk score is based on one or more of the residual values. Although several of the state prediction statistics 120 described above refer to time windows, one or more (e.g., all) of the state prediction statistics 120 may use non-time-based windowing, such as depth-based windowing.

A classifier preprocessor 122 may generate classifier input data 124 based on the state prediction statistics 120. The classifier input data 124 includes at least a subset of the state prediction statistics 120. In a particular implementation, the classifier model 126 includes or corresponds to a neural network, a decision tree, an XGBoost model, or another machine learning model that is trained to generate the classifier output data 128. In a particular aspect, the classifier output data 128 indicates whether the initial state prediction is reliable. For example, the classifier model 126 may be a binary classifier trained such that the classifier output data 128 includes a first value (e.g., TRUE) if the initial state prediction 114 is reliable or includes a second value (e.g., FALSE) if the initial state prediction 114 is not reliable. In another particular aspect, the classifier output data 128 indicates a potential failure mode associated with the initial state prediction.

The classifier output data 128 may be provided to a response system 130 to take action if a reliable prediction of abnormal behavior is detected (e.g., if the initial state prediction 114 indicates abnormal behavior and/or if a particular potential failure mode is predicted. For example, the response system 130 may send a command to the monitored asset or to a controller associated with the monitored asset to change operation of the monitored asset. To illustrate, the command may cause the monitored asset to change speeds (or other operational parameters), to turn off, etc. Additionally, or alternatively, the response system 130 may schedule activity associated with the monitored asset, such as an inspection activity or a maintenance activity. Additionally, or alternatively, the response system 130 may generate an alert to notify an operator or other responsible party.

In some implementations, as illustrated in FIG. 1, when the initial state prediction 114 indicates abnormal (or anomalous) behavior, a feature importance calculator 132 calculates feature importance data indicating which feature (e.g., which sensor data values) of the behavior model input data 106 contribute most strongly to the determination of abnormal behavior. In a particular example, a value of the feature importance data is calculated for each time step (or other sample window) of the behavior model input data 106. In a non-limiting example, the feature importance is calculated as a rolling mean of the absolute value of the residual values. In implementations that include the feature importance calculator 132, the particular response system 130 that takes action or the particular action taken by the response system 130 may be determined based, at least partially, on the feature importance data.

Figure 2:
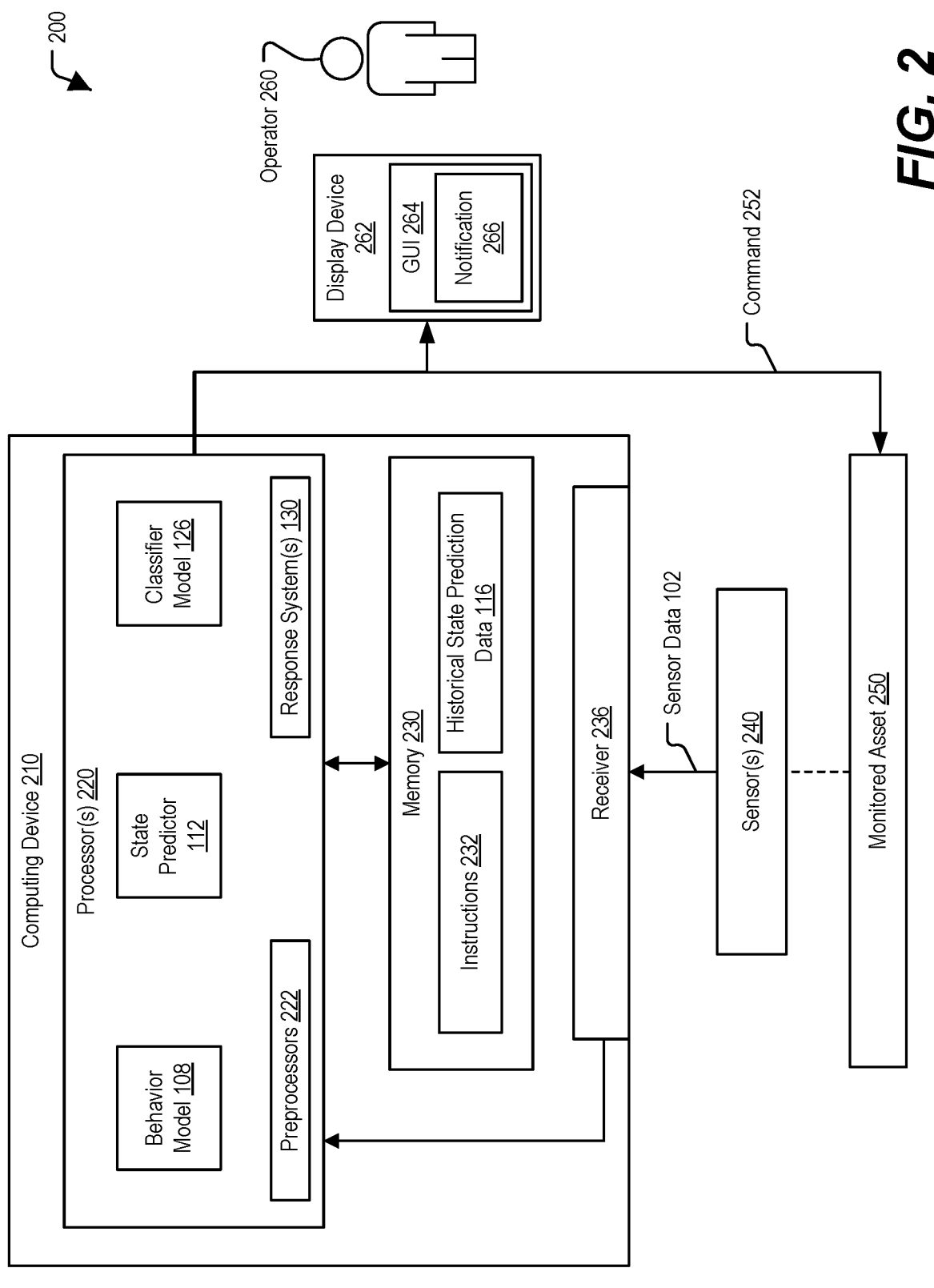
FIG. 2 is a block diagram illustrating a particular implementation of a system that may perform the operations of FIG. 1.

FIG. 2 depicts a system 200 to detect anomalous behavior of a monitored asset 250. The system 200 includes one or more sensors 240 coupled to the monitored asset 250. In this context, a "monitored asset" refers to one or more devices, one or more systems, or one or more processes that are monitored to detect abnormal behavior. To illustrate, the monitored asset 250 can include one or more mechanical devices, one or more electromechanical devices, one or more electrical devices, one or more electronic devices, or various combinations thereof. As one specific example, the monitored asset 250 may include a drilling rig, and the abnormal behavior may include a stuck pipe condition of a drill string of the drilling rig, as described in more detail with reference to FIG. 4.

A computing device 210 is coupled to the one or more sensors 240 and to a display device 262. The computing device 210 includes a receiver 236 and a memory 230 that are coupled to one or more processors 220. In various implementations, the computing device 210 is configured to use one or more trained models to determined, based on the sensor data 102, whether the monitored asset 250 is operating normally or abnormally and to selectively perform a response action, such as providing a notification 266 to an operator 260 (e.g., a technician or SME), or sending a control signal including a command 252 to the monitored asset 250.

In some implementations, the memory 230 includes volatile memory devices, non-volatile memory devices, or both, such as one or more hard drives, solid-state storage devices (e.g., flash memory, magnetic memory, or phase change memory), a random access memory (RAM), a read-only memory (ROM), one or more other types of storage devices, or any combination thereof. The memory 230 stores data (e.g., historical sensor data) and instructions 232 (e.g., computer code) that are executable by the one or more processors 220. For example, the instructions 232 can include one or more trained models (e.g., trained machine learning models) that are executable by the one or more processors 220 to initiate, perform, or control the various operations described with reference to FIG. 1. For example, the one or more trained models can include the behavior model 108, the state predictor 112, the classifier model 126, or a combination thereof. Additionally, the instructions 232 may include preprocessors 222, such as the behavior model preprocessor 104, the prediction statistic calculator 118, the classifier preprocessor 122, or a combination thereof. The instructions 232 may also include the response system 130.

The one or more processors 220 include one or more single-core or multi-core processing units, one or more digital signal processors (DSPs), one or more graphics processing units (GPUs), or any combination thereof. The one or more processors 220 are configured to receive, via the receiver 236, a portion of the sensor data 102 sensed during a sensing period. The one or more processors 220 are configured to preprocess the portion of the sensor data 102 to generate the behavior model input data 106 based on the sensor data 102, to provide the behavior model input data 106 to the behavior model 108 to generate the behavior model output data 110, and to generate the initial state prediction 114 based on the behavior model output data 110. If the initial state prediction 114 indicates a particular state (e.g., abnormal behavior), the one or more processors 220 are configured to generate the state prediction statistics 120 based on the initial state prediction 114 and the historical state predictions (of the historical state prediction data) that indicate the particular state (e.g., abnormal behavior), and to provide the classifier input data 124 to the classifier model 126 to generate the classifier output data 128 (e.g., a classification output) indicating whether the initial state prediction 114 is reliable. The one or more processors 220 generate the classifier input data 124 based on the state prediction statistics 120.

In some implementations, the response system 130 is executable by the one or more processors 220 to generate a graphical user interface (GUI) 264 to display the notification 266 at a display device 262 of an operator 260 of the monitored asset 250. The GUI 264 may also provide additional information related to the alert, such as feature importance data.

The receiver 236 is configured to receive the sensor data 102 from the one or more sensors 240. In an example, the receiver 236 includes a bus interface, a wireline network interface, a wireless network interface, or one or more other interfaces or circuits configured to receive the sensor data 102 via wireless transmission, via wireline transmission, or any combination thereof.

Although FIG. 2 depicts the display device 262 as coupled to the computing device 210, in other implementations the display device 262 is integrated within the computing device 210. Although the display device 262 is illustrated as providing the notification 266 via the GUI 264 at the display device 262, in other implementations the notification 266 may alternatively, or additionally, be provided via one or more other mechanisms, such as an output interface that includes at least one of a light, a buzzer, or a signal port. In some implementations, functionality corresponding to the sensor(s) 240 and the computing device 210 are integrated into a single device, such as within a common housing.

Figure 3:
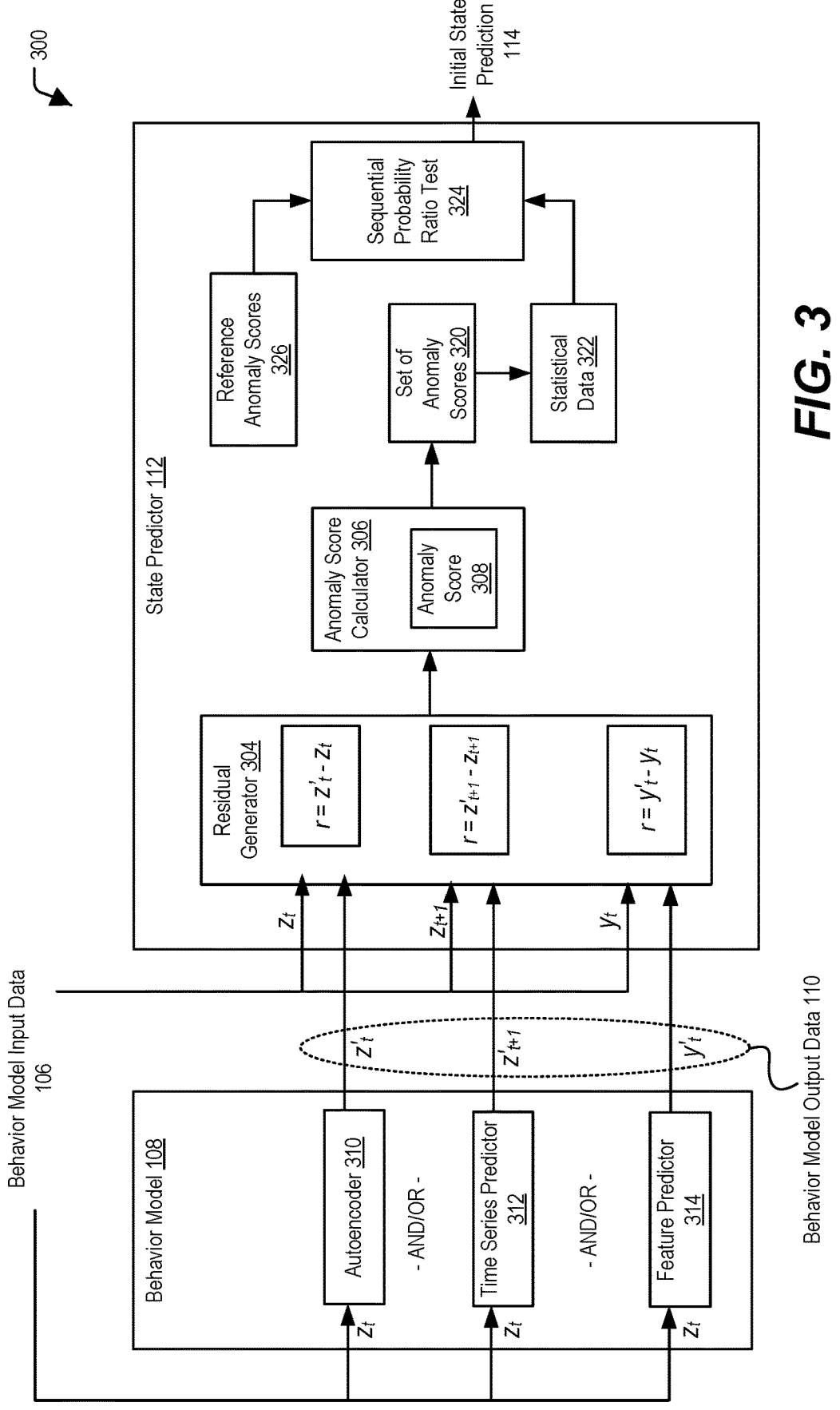
FIG. 3 is a block diagram of components that may be included in the system of FIG. 2 in accordance with some examples of the present disclosure.

FIG. 3 depicts a block diagram 300 of a particular implementation of components that may be included in the computing device 210 of FIG. 2. In the non-limiting example illustrated in FIG. 3, the behavior model 108 includes one or more of an autoencoder 310, a time series predictor 312, or a feature predictor 314. Additionally, in the non-limiting example illustrated in FIG. 3, the state predictor 112 includes a residual generator 304, an anomaly score calculator 306, and a test calculator 324 (e.g., a sequential probability ratio test calculator). Each of the behavior model(s) 108 is trained to receive behavior model input data 106 (e.g., from the behavior model preprocessor 104) and to generate a behavior model output data 110. The residual generator 304 is configured to compare one or more values of the behavior model output data 110 to one or more values of the behavior model input data 106 (or the sensor data 102) to determine the residuals data.

The autoencoder 310 may include or correspond to a dimensional-reduction type autoencoder, a denoising autoencoder, or a sparse autoencoder. Additionally, in some implementations the autoencoder 310 has a symmetric architecture (e.g., an encoder portion of the autoencoder 310 and a decoder portion of the autoencoder 310 have mirror-image architectures). In other implementations, the autoencoder 310 has a non-symmetric architecture (e.g., the encoder portion has a different number, type, size, or arrangement of layers than the decoder portion).

The autoencoder 310 is configured to receive behavior model input data 106 denoted as $z_t$ in FIG. 3. The autoencoder 310 is trained to modify the behavior model input data 106 and reconstruct the model input data to generate behavior model output data 110 denoted as $z'_t$ in FIG. 3 (where ' indicates an estimate). The behavior model input data 106 is based on values of one or more features of the sensor data 102 for a particular timeframe (t), and the behavior model output data 106 includes estimated values of the one or more features (e.g., the same features as the behavior model input data 106) for the particular timeframe (t) (e.g., the same timeframe as the behavior model input data 106). In a particular, non-limiting example, the autoencoder 310 is an unsupervised neural network that includes an encoder portion to compress the behavior model input data 106 to a latent space (e.g., a layer that contains a compressed representation of the behavior model input data 106), and a decoder portion to reconstruct the behavior model input data 106 from the latent space to generate the behavior model output data 110. The autoencoder 310 can be generated and/or trained via an automated model building process, an optimization process, or a combination thereof to reduce or minimize a reconstruction error between $z_t$ and $z'_t$ when the behavior model input data 106 represents normal operation conditions associated with a monitored asset 250.

The time series predictor 312 may include or correspond to one or more neural networks trained to forecast future data values (such as a regression model or a generative model). The time series predictor 312 is trained to receive behavior model input data 106 denoted as $z_t$ for a particular timeframe (t) and to generate as behavior model output data 110 denoted as $z'_{t+1}$, which represents an estimate or prediction of the one or more values of the behavior model input data 106 for a future timeframe (t+1). The behavior model input data 106 includes values based on the sensor data 102 (e.g., readings from one or more sensors) for the particular timeframe (t), and the behavior model output data 110 includes estimated values of the one or more features (e.g., the same features at the behavior model input data 106) for a different timeframe (t+1) than the timeframe of the behavior model input data 106. The time series predictor 312 can be generated and/or trained via an automated model building process, an optimization process, or a combination thereof to reduce or minimize a prediction error between $z_t$ and $z'_{t+1}$ when the behavior model input data 106 represents normal operation conditions associated with a monitored asset 250.

The feature predictor 314 may include or correspond to one or more neural networks trained to predict data values based on other data values (such as a regression model or a generative model). The feature predictor 314 is trained to receive, as model input, one or more values of the behavior model input data 106 (denoted as $z_t$) for a particular timeframe (t) and to estimate or predict one or more other values of the behavior model input data 106 (denoted $y_t$) to generate behavior model output data 110 (denoted as $y'_t$). The behavior model input data 106 includes values based on the sensor data 102 (e.g., readings from one or more sensors) for the particular timeframe (t), and the behavior model output data 110 includes estimated values of the one or more other values based on the sensor data 102 for the particular timeframe (t) (e.g., the same timeframe as the behavior model input data 106). The feature predictor 314 can be generated and/or trained via an automated model building process, an optimization process, or a combination thereof to reduce or minimize a prediction error between the $y_t$ and $y'_t$ when the behavior model input data 106 represents normal operation conditions associated with a monitored asset 250.

The residual generator 304 is configured to generate residual values (denoted as r) based on a difference between compared features of the behavior model input data 106 and the behavior model output data 110. For example, a residual associated with the autoencoder 310 can be determined according to $r=z_t'-z_t$. As another example, a residual associated with the time series predictor 312 can be determined according to $r=z_{t+1}'-z_{t+1}$. As yet another example, a residual associated with the feature predictor 314 can be determined according to $r=y_t'-y_t$. Generally, the behavior model input data 106 and the behavior model output data 110 are multivariate (e.g., a set of multiple values, with each value representing a feature), in which case the residual generator 304 calculates multiple residuals for each sample time frame to form residual data for the sample time frame.

The anomaly score calculator 306 determines an anomaly score 308 for a sample time frame based on the residual data. The anomaly score 308 is used to determine the initial state prediction 114.

In FIG. 3, a set of anomaly scores 320 representing multiple sample time frames is generated and used to generate statistical data 322. In the illustrated example, the statistical data 322 is used to perform a sequential probability ratio test 324. The sequential probability ratio test 324 is a sequential hypothesis test that provides continuous validations or refutations of the hypothesis that the monitored asset is behaving abnormally, by determining whether the anomaly score 308 continues to follow, or no longer follows, normal behavior statistics of reference anomaly scores 326. In some implementations, the reference anomaly scores 326 include data indicative of a distribution of reference anomaly scores (e.g., mean and variance) instead of, or in addition to, the actual values of the reference anomaly scores. The sequential probability ratio test 324 provides an early detection mechanism and supports tolerance specifications for false positives and false negatives. A result of the sequential probability ratio test 324 is used to generate the initial state prediction 114. For example, the initial state prediction 114 indicates abnormal behavior when the sequential probability ratio test 324 validates the hypothesis that the monitored asset 250 is behaving abnormally.

Figure 4:
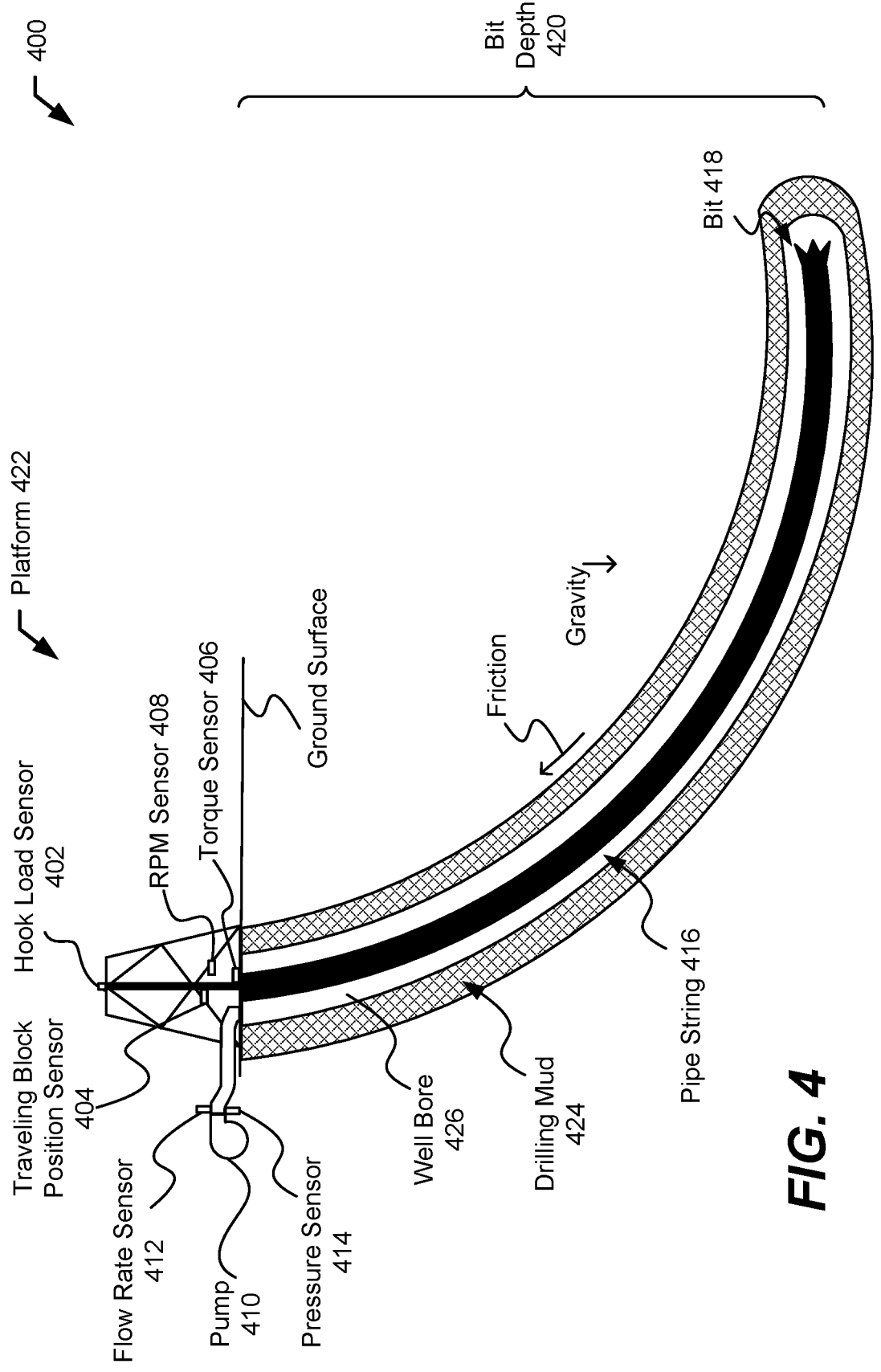
FIG. 4 is a diagram illustrating one, non-limiting, example of a system that may use the system of FIG. 2 in accordance with some examples of the present disclosure.

FIG. 4 is a block diagram illustrating one example of the monitored asset 250. In FIG. 4, the monitored asset 250 corresponds to or includes a drilling rig 400, as a specific, non-limiting example. In this example, the drilling rig 400 includes a bit 418 coupled to a pipe string 416 operated from a platform 422. The drilling rig 400 also includes a pump 410 configured to pump drilling mud 424 into a well bore 426.

The drilling rig 400 includes a variety of sensors configured to generate sensor data (e.g., the sensor data 102) indicative of operation of the drilling rig 400. For example, the sensors illustrated in FIG. 4 include, without limitation, a hook load sensor 402, a traveling block position sensor 404, a torque sensor 406, a rotation rate sensor (e.g., revolutions per minute (RPM) sensor 408 in FIG. 4), a flow rate sensor 412, and a pressure sensor 414. The drilling rig 400 may also include a bit depth sensor, or bit depth 420 may be tracked based on other information from down hole or above ground sensors.

The system 200 of FIG. 2 may be coupled to or included within a control system of the drilling rig 400 of FIG. 4 to detect or predict various abnormal operation conditions. For example, under certain conditions, the pipe string 416 can become stuck in the well bore (which is referred to herein as a "stuck pipe condition"), such as due to differential mud pressure, due to well bore collapse, due to geometry of the well bore 426, etc. The system 200 can be used to predict stuck pipe conditions based on available sensor data, which enables a drilling rig operator to reevaluate drilling operations before the pipe string becomes stuck.

As another example, the system 200 can be used to monitor annular integrity of a well. Annular integrity is an aspect of well integrity. Much of the traditional focus on well integrity has been on establishing maximum and minimum pressure limits and designing envelopes under various well conditions encountered during well construction and subsequent production and injection operations. For example, many operators have established systems for operating wells within a specified design envelope to monitor for pressure excursions. Using such systems, abnormal annulus pressure behavior within the design envelope could be overlooked even though it may be indicative of a concern that could be corrected to prevent lost time issues. To illustrate, abrupt pressure build up in producer and water injection annulus wells may indicate a problem that could be addressed before the annulus pressure reaches a design limit.

Figure 5:
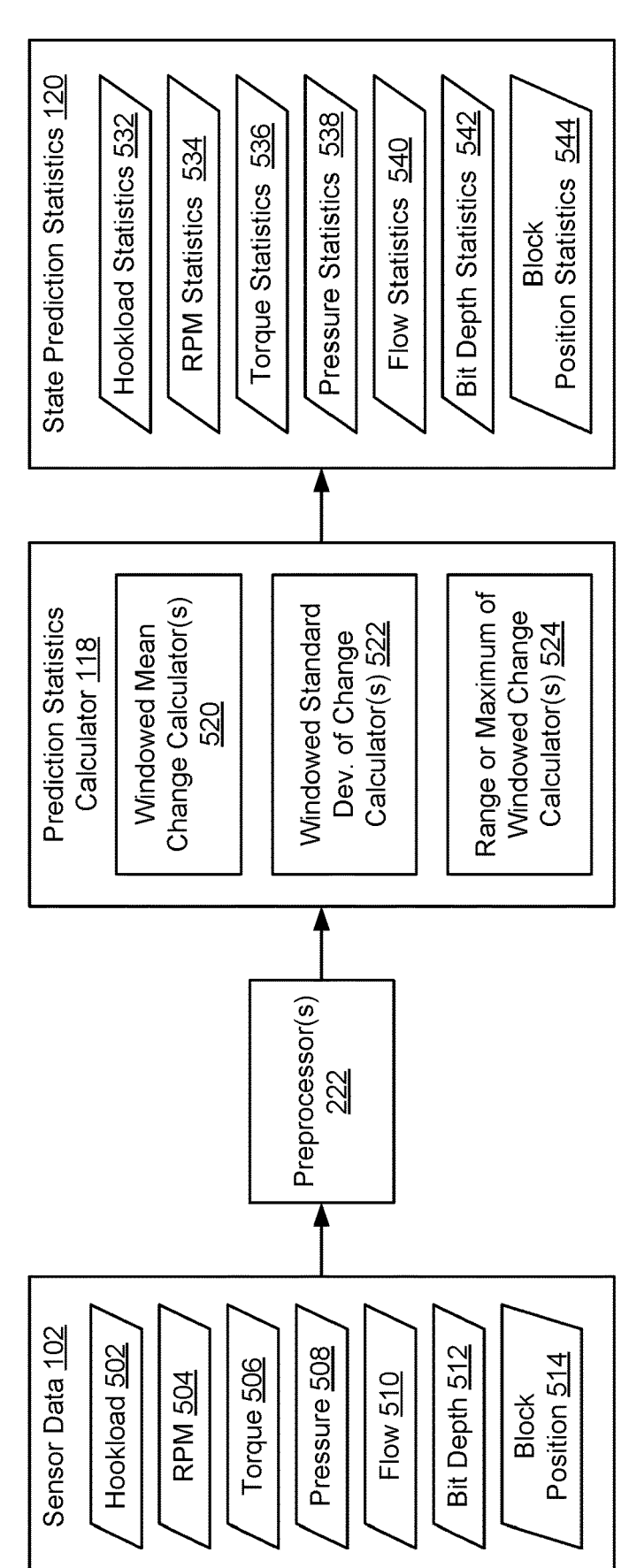
FIG. 5 is a diagram illustrating particular aspects of operations associated with the system of FIG. 4 in accordance with some examples of the present disclosure.

FIG. 5 is a diagram 500 illustrating operations that may be performed by the system 200 to predict stuck pipe conditions. In particular, FIG. 5 illustrates operations to determine state prediction statistics based on the sensor data 102. In FIG. 5, the sensor data 102 includes hookload data 502 based on measurements from the hook load sensor 402 of FIG. 4, RPM data 504 based on measurements from the RPM sensor 408, torque data 506 based on measurement from the torque sensor 406, pressure data 508 based on measurements from the pressure sensor 414, flow data 510 based on measurements from the flow rate sensor 412, bit depth data 512 based on the bit depth 420, and block position data 514 based on measurements from the traveling block position sensor 404. In other examples, the sensor data 102 includes more, fewer, or different values.

In FIG. 5, the preprocessor(s) 222 modify (e.g., resample, impute, transform, etc.) the sensor data 102 (as described with reference to FIG. 1) and provide the modified sensor data to the prediction statistics calculator 118. The prediction statistics calculator 118 determines state prediction statistics 120 based on the modified sensor data (as described with reference to FIG. 1). For example, the prediction statistics calculator 118 may determine hookload statistics 532 based on various windowings (e.g., various time windows, various depth windows, or both) of the hookload data 502. As another example, the prediction statistics calculator 118 may determine RPM statistics 534 based on various windowings (e.g., various time windows, various depth windows, or both) of the RPM data 504. As another example, the prediction statistics calculator 118 may determine torque statistics 536 based on various windowings (e.g., various time windows, various depth windows, or both) of the torque data 506. As still another example, the prediction statistics calculator 118 may determine pressure statistics 538 based on various windowings (e.g., various time windows, various depth windows, or both) of the pressure data 508. As yet another example, the prediction statistics calculator 118 may determine flow statistics 540 based on various windowings (e.g., various time windows, various depth windows, or both) of the flow data 510. As another example, the prediction statistics calculator 118 may determine bit depth statistics 542 based on various windowings (e.g., various time windows) of the bit depth data 512. As yet another example, the prediction statistics calculator 118 may determine block position statistics 544 based on various windowings (e.g., various time windows, various depth windows, or both) of the block position data 514.

In the example illustrated in FIG. 5, the prediction statistics calculator 118 includes one or more windowed mean change calculators 520. The windowed mean change calculator(s) 520 are configured to calculate windowed (e.g., time windowed or bit depth windowed) state prediction statistics 120 based on values of the sensor data 102. In the example illustrated in FIG. 5, the prediction statistics calculator 118 includes one or more windowed standard deviation change calculators 522. The windowed standard deviation change calculator(s) 522 are configured to calculate windowed (e.g., time windowed or bit depth windowed) state prediction statistics 120 based on values of the sensor data 102. In the example illustrated in FIG. 5, the prediction statistics calculator 118 includes one or more range or maximum windowed change calculators 524. The range or maximum windowed change calculator(s) 524 are configured to calculate windowed (e.g., time windowed or bit depth windowed) state prediction statistics 120 based on values of the sensor data 102.

In a particular implementation, the state prediction statistics 120 include, for example, alert duration, alert window risk score mean, alert window risk score standard deviation, 25th and 75th percentile of alert window risk scores, slope of risk score within the alert window, number of alerts 15, 30 and 60 mins before the alert, risk score mean, standard deviation and slope for alerts that are 15, 30 and 60 mins before the alert, each based on the sensor data 102.

In a particular implementation, predictive analytics and machine learning-based modeling are used to detect drilling anomalies, such as stuck pipe events. The following is an example of an analysis that focuses on historical drilling data and real-time operational data to address the limitations of physics-based modeling in order to enable drilling crews to minimize downtime and non-productive time through real-time anomaly management. In the following analysis, data science techniques were used to overcome data consistency/quality issues and flag drilling anomalies leading to a stuck pipe event. Predictive machine learning models were used to evaluate seven wells in different fields. The models analyzed both historical and real-time data across various data channels to identify anomalies (difficulties that impact non-productive time). The modeling approach mimicked the behavior of drillers using surface parameters. Small deviations from normal behavior were identified based on combinations of surface parameters, and automated machine learning was used to accelerate and optimize the modeling process. The output was a risk score that flags deviations in rig surface parameters.

The models described herein detected drilling anomalies with a harmonic model accuracy of 80% and produced valid alerts on 96% of stuck pipe and tight hole events. The average forewarning was two hours. This allowed personnel ample time to make corrections before stuck pipe events could occur. This also enabled the drilling operator to save the company upwards of millions of dollars in drilling costs and downtime.

The analysis used data aggregation and deep learning-based normal behavior modeling methods. The analysis demonstrates the benefits of adopting predictive analytics and machine learning in drilling operations. The approach enabled operators to mitigate data issues and demonstrate real-time, high-frequency and high-accuracy predictions. As a result, the operator was able to significantly reduce non-productive time.

Drilling and completion account for a large portion of capital expenditures for petroleum production. By some estimates, time-related costs contribute 70% to 80% of overall drilling and completion costs. Therefore, to improve return on capital, it is beneficial to maximize drilling and completion efficiency by maximizing productive time and minimizing non-productive time (NPT).

Drilling dysfunctions, such as stuck pipe, can be a major contributors to NPT. A stuck pipe situation can halt drilling activities, requiring the work crew to focus on the dysfunction, and delaying the drilling plan.

For purposes of the following analysis, events of interest are broken into two event types: 1) direct NPT impacting events (e.g., stuck pipe), 2) indirect NPT impacting events (e.g., tight spots that may lead to stuck pipes or other slowdowns). The indirect NPT impacting events may further be broken down into those which, after identification, led to operational changes and those which were not addressed via operational changes.

At a high level, stuck pipe can be categorized into 2 broad categories: differential sticking and mechanical sticking. Differential sticking occurs when the mud column pressure exceeds the formation fluid's pressure, leading to the pipe becoming embedded in the mud cake, and causing a stuck pipe. Torque, pick-up, and slack-off can be good indicators to warn against potential differential sticking. Mechanical sticking, on the other hand, can be attributed to pack-off, keyseating, wellbore collapse, and other issues. Standpipe pressure, torque, and hookload are useful as early indicators of mechanical sticking.

Historically, operators used physics-based torque and drag models to plan and monitor drilling operations, aiming at reducing NPT. The approach was to use physics modeling to model torque, drag, and hydraulics independently, then to alert the drilling operations team based on deviation of torque, drag, and standpipe pressure from their theoretical values.

This traditional approach introduced limitations to the drilling operations team. For example, the traditional approach is dependent on subject matter experts to establish a threshold for deviation from theoretical values. As another example, in the traditional approach, theoretical value estimates are highly dependent and sensitive to bottom hole assembly, well trajectory, mud properties, and other factors. This makes the deviation threshold very hard to generalize. As another example, some models used in the traditional approach tend to oversimplify assumptions of local conditions, such as the soft-string model. As another example, in the traditional approach, torque, drag, and hydraulics are modeled and analyzed independently. This ignores interdependence between surface parameters. As another example, the traditional approach does not take into account certain time aspects. To illustrate, a physics based approach works based on a single spot value in time, whereas stuck pipe prediction can be better approached using time-based trends. As another example, in the traditional approach, the operator used absolute values of parameters to model torque, drag, and hydraulics. Due to the nature of work on rigs, absolute values might be skewed because of data calibration issues. Those data issues do not mean that the rig is operationally dysfunctional, however, data is skewed.

In contrast to the traditional approach, the analysis described herein used machine learning and artificial intelligence technologies to build models that use minimal data from surface parameters. The models were applied to model normal behavior of drilling operations in open holes and to identify deviation(s) from normal behavior. Additionally, models were used to classify deviations based on their impact on stuck-pipe and tight holes. The output of the machine learning models were risk scores and alerts. The risk scores reflect in real-time the riskiness of the drilling operation, and alerts highlight real-time drilling incidents with elevated risk and potential stuck-pipe/tight hole impact.

Due to availability and quality of data, surface parameters were used for the analysis. Following is a non-limiting list of surface parameters that were available and considered for modeling and monitoring purposes:

RPM: rotary speed of the drill string.

Torque: the rotational force between the drill string and the formation.

Block position: The position of the block in the derrick.

Bit depth: the depth of the bit in the drilled hole.

Hole depth: the measured depth of the drilled hole.

Hookload: the total downward force acting on the hook (attached to the bottom of the travelling block).

Flow in: flow rate supplied from the mud pumps.

Standpipe pressure: total pressure loss due to fluid friction.

Data was collected and analyzed for multiple sections, wells, rigs, and fields. Analysis of the data indicated that data calibration issues consistently impact the distribution of features, making it difficult for models to generalize. For example, the block position for some wells ranged between 0 feet and 150 feet, whereas for other wells, the block position started from a negative value. Similarly, a wide range of hookload values where noted among different rigs.

To overcome the identified data issues, and prior to starting the modeling exercise, multiple feature engineering approaches were used with the aim of:

Reducing the effect of data calibration errors.

Reducing the dependence of modeling on depth and trajectory.

Addressing the issue of time inconsistent sampling rates and time stamps for surface parameters Addressing the issue of the unexpected/highly variable distribution of surface parameters across multiple formations, sections, wells, fields and rigs.

Focusing on the symptoms visible on surface parameters.

Keeping the above objectives in mind, input surface parameters were transformed through the use of multiple feature engineering methodologies, as well as implementing different interval rolling windows for maximum, average, and standard deviation of surface parameters.

A normal behavior model (NBM) was trained using deep neural network algorithms that learn "normal" operating conditions from historical data. The NBM was used to predict values for particular variables based on new data processed by the NBM. The NBM predictions were compared to corresponding actual surface parameter values. Residuals between predicted values and actual values were normalized and combined to produce an anomaly score for each timestamp. When the anomaly score exceeded a statistically defined threshold, the model triggered an alert for the abnormal behavior. The NBM provided both predictive capability through early anomaly detection and interpretability by pointing to root causes in the form of feature importance.

FIGS. 6-9 are block diagrams illustrating various systems 600, 700, 800, and 900, respectively, corresponding to processing arrangements that were tested. The block diagrams of FIGS. 6-9 illustrate alternative manners of visualizing portions of the diagram 100 of FIG. 1. For example, one or more of FIGS. 6-9 illustrate a normal behavior model 610, which corresponds to a particular implementation of the behavior model 108 of FIGS. 1-3. As another example, one or more of FIGS. 6-9 illustrate a feature engineering block 630, which corresponds to a particular implementation of the preprocessor 222 of FIG. 2. As another example, in some implementations, the anomaly score calculator 306 of FIG. 3 corresponds to or includes a threshold-based alerting model 620, the feature engineering block 630, or both, of one or more of FIGS. 6-9. As another example, in some implementations, the classifier preprocessor 122 of FIG. 1 corresponds to or includes the threshold-based alerting model 620, the feature engineering block 630, or both, of one or more of FIGS. 6-9. As another example, in some implementations, the classifier model 126 of FIG. 1 corresponds to or includes the threshold-based alerting model 620, a binary alert classifier 640, or both, of one or more of FIGS. 6-9.

In FIGS. 6-9, surface parameters 602 are provided as input data. In some implementations, the surface parameters 602 include or correspond to the sensor data 102 of FIGS. 1, 2, and 5, or portions thereof. In some implementations, the surface parameters 602 include or correspond to the behavior model input data 106 of FIGS. 1 and 3.

Figure 6:
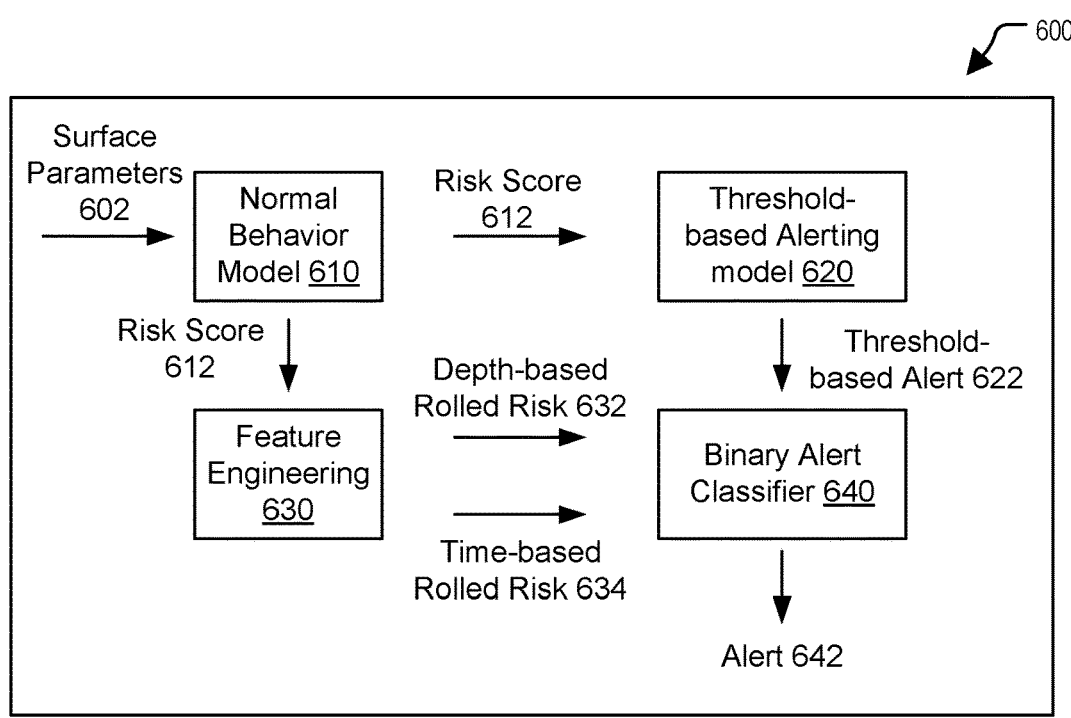
FIG. 6 is a block diagram illustrating a particular implementation of a system corresponding to an illustrative processing arrangement to generate a state prediction and to model the reliability of the state prediction in accordance with some examples of the present disclosure.

In FIG. 6, the normal behavior model 610 receives input data based on the surface parameters 602 and generates as output a risk score 612. The risk score 612 is provided to the threshold-based alerting model 620 and to the feature engineering block 630. The threshold-based alerting model 620 generates a threshold-based alert indication 622 indicating whether the risk score 612 satisfies a threshold-based alert condition.

In FIG. 6, the feature engineering block 630 determines a depth-based rolled risk 632 based on the risk score 612 and a bit depth (e.g., bit depth 420) associated with the surface parameters 602. Additionally, in FIG. 6, the feature engineering block 630 determines a time-based rolled risk 634 based on the risk score 612 and a time associated with the surface parameters 602. In this context, "rolled risk" indicates a statistical value representative of a windowed set of risk scores. In the case of the depth-based rolled risk 632, the risk scores are windowed by bit depth. In the cases of the time-based rolled risk 634, the risk scores are time windowed.

In FIG. 6, the threshold-based alert indication 622, the depth-based rolled risk 632, the time-based rolled risk 634, or a combination thereof, are provided to the binary alert classifier 640. The binary alert classifier 640 determines whether to generate an alert 642 based on the threshold-based alert indication 622, the depth-based rolled risk 632, the time-based rolled risk 634, or a combination thereof.

Figure 7:
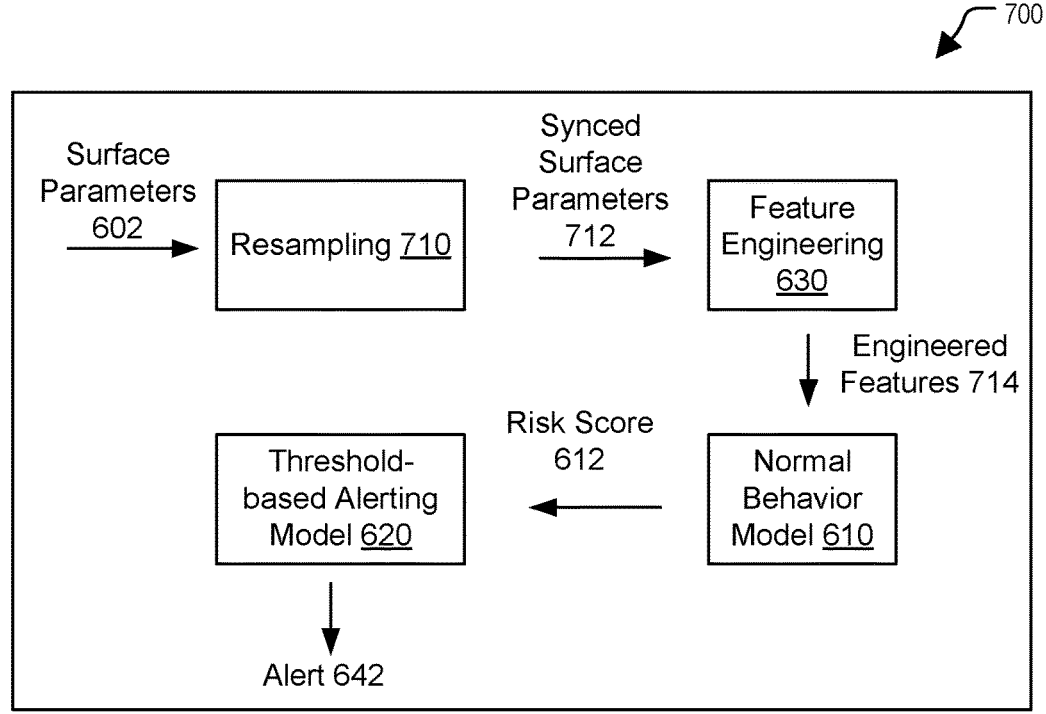
FIG. 7 is a block diagram illustrating another particular implementation of a system corresponding to an illustrative processing arrangement to generate a state prediction and to model the reliability of the state prediction in accordance with some examples of the present disclosure.

In FIG. 7, a resampling block 710 (e.g., part of the preprocessor 222 of FIG. 2) resamples or otherwise processes the surface parameters 602 to generate time-synchronized ("synced") surface parameters 712. The synced surface parameters 712 are provided to the feature engineering block 630.

In FIG. 7, the feature engineering block 630 generates engineered features 714 based on the synced surface parameters 712. For example, the feature engineering block 630 may determine, for one or more of the synced surface parameters 712, a rolling average (e.g., a rolling mean), a rolling dispersion (e.g., a rolling standard deviation), a rolling maximum, a rolling minimum, etc.

In FIG. 7, the engineered features 714 are provided to the normal behavior model 610, and the normal behavior model 610 determines the risk score 612 based on the engineered features 714. The risk score 612 is provided to the threshold-based alerting model 620. In the example illustrated in FIG. 7, the threshold-based alerting model 620 determines whether to generate the alert 642 based on a comparison of the risk score 612 to a threshold-based alert condition.

Figure 8:
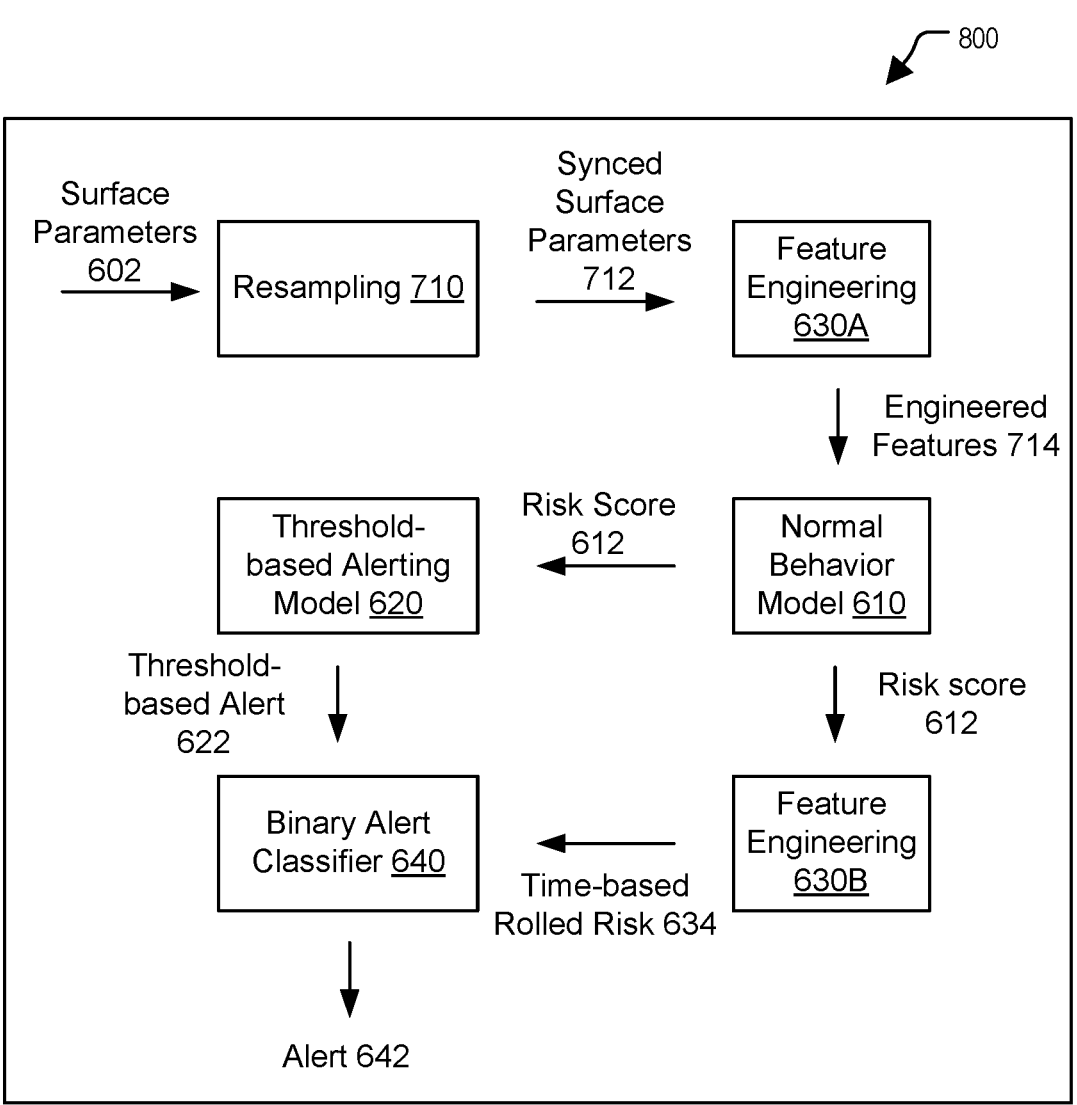
FIG. 8 is a block diagram illustrating another particular implementation of a system corresponding to an illustrative processing arrangement to generate a state prediction and to model the reliability of the state prediction in accordance with some examples of the present disclosure.

In FIG. 8, a resampling block 710 (e.g., part of the preprocessor 222 of FIG. 2) resamples or otherwise processes the surface parameters 602 to generate the synced surface parameters 712. The synced surface parameters 712 are provided to a first feature engineering block 630A.

In FIG. 8, the first feature engineering block 630A generates engineered features 714 based on the synced surface parameters 712. For example, the first feature engineering block 630A may determine, for one or more of the synced surface parameters 712, a rolling average (e.g., a rolling mean), a rolling dispersion (e.g., a rolling standard deviation), a rolling maximum, a rolling minimum, etc.

In FIG. 8, the engineered features 714 are provided to the normal behavior model 610, and the normal behavior model 610 determines the risk score 612 based on the engineered features 714. The risk score 612 is provided to the threshold-based alerting model 620 and to a second feature engineering block 630B.

The threshold-based alerting model 620 of FIG. 8 generates the threshold-based alert indication 622 indicating whether the risk score 612 satisfies a threshold-based alert condition. The second feature engineering block 630B of FIG. 8 determines the time-based rolled risk 634 based on the risk score 612 and a time associated with the surface parameters 602.

In FIG. 8, the threshold-based alert indication 622 and the time-based rolled risk 634 are provided to the binary alert classifier 640. The binary alert classifier 640 determines whether to generate the alert 642 based on the threshold-based alert indication 622, the time-based rolled risk 634, or both.

Figure 9:
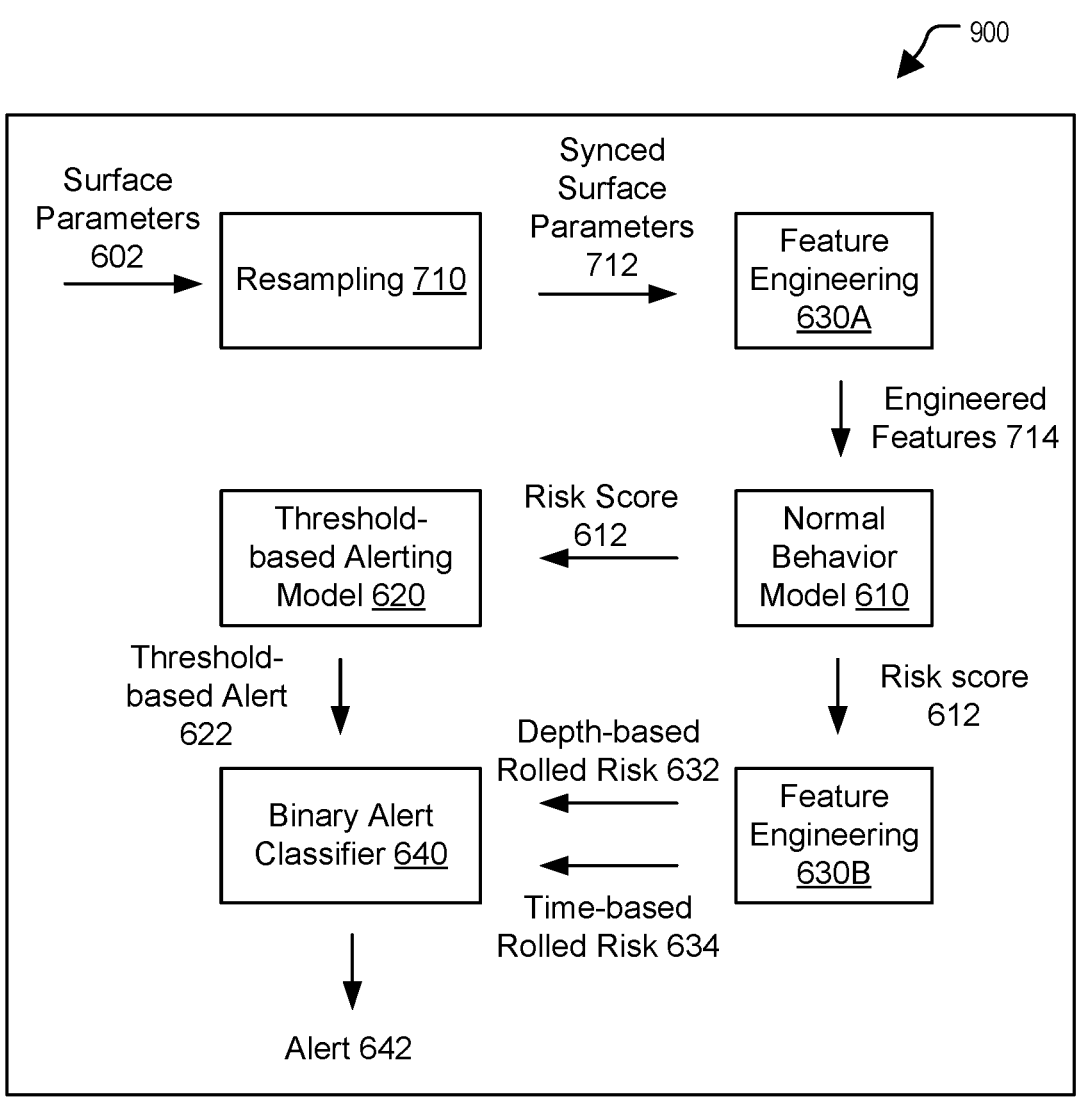
FIG. 9 is a block diagram illustrating another particular implementation of a system corresponding to an illustrative processing arrangement to generate a state prediction and to model the reliability of the state prediction in accordance with some examples of the present disclosure.

In FIG. 9, a resampling block 710 (e.g., part of the preprocessor 222 of FIG. 2) resamples or otherwise processes the surface parameters 602 to generate the synced surface parameters 712. The synced surface parameters 712 are provided to a first feature engineering block 630A.

In FIG. 9, the first feature engineering block 630A generates engineered features 714 based on the synced surface parameters 712. For example, the first feature engineering block 630A may determine, for one or more of the synced surface parameters 712, a rolling average (e.g., a rolling mean), a rolling dispersion (e.g., a rolling standard deviation), a rolling maximum, a rolling minimum, etc.

In FIG. 9, the engineered features 714 are provided to the normal behavior model 610, and the normal behavior model 610 determines the risk score 612 based on the engineered features 714. The risk score 612 is provided to the threshold-based alerting model 620 and to the second feature engineering block 630B.

The threshold-based alerting model 620 of FIG. 9 generates the threshold-based alert indication 622 indicating whether the risk score 612 satisfies a threshold-based alert condition. The second feature engineering block 630B of FIG. 8 determines the depth-based rolled risk 632 based on the risk score 612 and a bit depth (e.g., bit depth 420) associated with the surface parameters 602. The feature engineering block 630B also determines the time-based rolled risk 634 based on the risk score 612 and a time associated with the surface parameters 602.

In FIG. 9, the threshold-based alert indication 622, the depth-based rolled risk 632, the time-based rolled risk 634, or a combination thereof, are provided to the binary alert classifier 640. The binary alert classifier 640 determines whether to generate the alert 642 based on the threshold-based alert indication 622, the depth-based rolled risk 632, the time-based rolled risk 634, or a combination thereof.

Output of the analysis was independently evaluated by subject matter experts (SMEs), including drilling engineers. The SMEs used the raw data and the model outputs to verify model performance. Using the data, the SMEs identified anomalies in the drilling operations. This information was compared with the alerts that the solution generated. The alerts were then labeled with one of the options listed in Table 1 below.

TABLE 1

| Labels for Evaluation | | |
| --- | --- | --- |
| Label | Label Description | Evaluation Impact |
| Not drilling related | Anomalies are not drilling related, or not in open hole | Not applicable - Only drilling conditions were used for model evaluation purposes |
| Data Issue | Issues related to received data quality. | True Positive (TP) |
| Difficulty Level 1 | An anomaly is observed; however, it did not impact the drilling operations. | |
| Difficulty Level 2 | An anomaly is observed; it impacted the duration of the operation without causing a rig action. | |
| Difficulty Level 3 | An anomaly is observed; it caused a change in drilling operation. | |
| Stick-Slip | An anomaly is observed due to stick and slip. | |
| Stuck Pipe | Stuck pipe or tight hole forewarning. | |
| Surface-Induced | Anomalies observed when rig actions are performed. | |
| False Positive | False Alert - alert raised but no anomaly observed. | False Positive (FP) |
| False Negative | A drilling anomaly is observed in the data; however, there is no corresponding alert from the model. | False Negative (FN) |

The overall metric that is used to evaluate the harmonic accuracy of the model is an F1 score, presenting accuracy in a measure between 0 and 1, with an F1 score value of 1 reflecting perfect model accuracy; capturing 100% of the alerts, and not raising a single false alert, and an F1 score of 0 means a model with 100% false alerts AND/OR 100% missed alerts.

As shown above, the labels were then categorized as True Positive (TP), False Positive (FP), and False Negative (FN). These categorizations were used to calculate model accuracy metrics such as precision, recall, and F1 score.

A model was subjected to three iterations to improve the model's performance in terms of F1 Score (e.g., harmonic mean of the model's precision and recall) and number of alerts raised. Looking into the distribution of alarms, most of the reduction was from fewer False Positives. This indicates that the model becomes less noisy without meaningfully affecting its ability to detect truly anomalous behavior, e.g., the number of True Positives. Fewer False Positives also improves the user experience.

FIG. 10 is a flow chart of an example of a method 1000 in accordance with some examples of the present disclosure. One or more operations described with reference to FIG. 10 may be performed by the computing device 210, such as by the processor(s) 220 executing the instructions 232.

The method 1000 includes, at 1002, providing behavior model input data to a behavior model to generate behavior model output data. For example, the behavior model preprocessor 104 may process the sensor data 102 to generate the behavior model input data 106 and provide the behavior model input data 106 to the behavior model 108.

The method 1000 includes, at 1004, generating an initial state prediction based on the behavior model output data. For example, the state predictor 112 may generate the initial state prediction 114 based on the behavior model output data 110 from the behavior model 108.

The method 1000 includes, at 1006, based on the initial state prediction indicating a particular state, generating state prediction statistics, the state prediction statistics based on the initial state prediction and historical state predictions indicating the particular state. For example, when the initial state prediction 114 indicates abnormal behavior, the prediction statistics calculator 118 may calculate the state prediction statistics based on the initial state prediction 114 and the historical state prediction data 116.

The method 1000 includes, at 1008, providing classifier input data to a classifier model to generate a classification output indicating whether the initial state prediction is reliable, where the classifier input data is generated based on the state prediction statistics. For example, the classifier model 126 may generate the classifier output data 128 based on the state prediction statistics 120.

Figure 11:
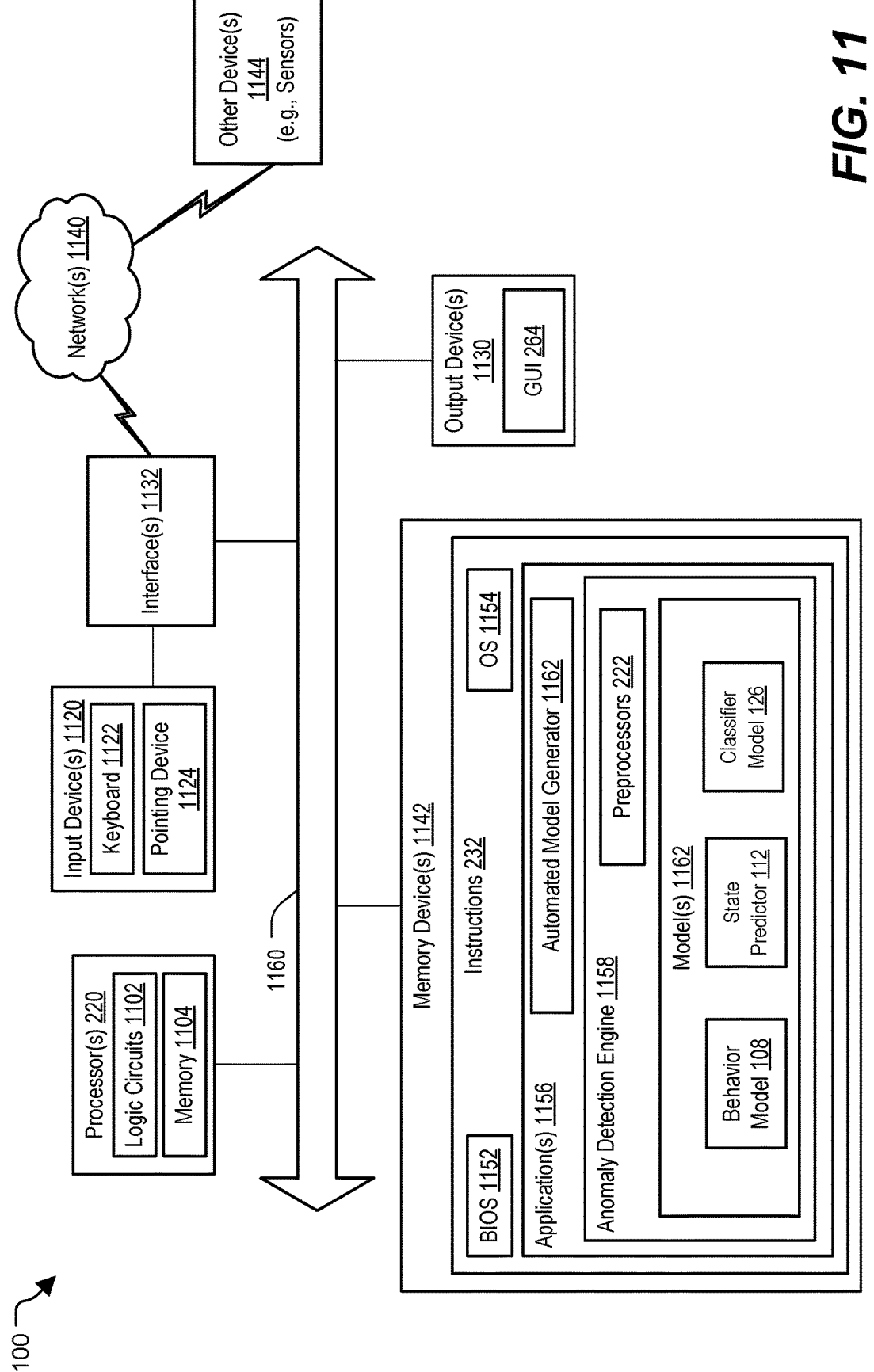
FIG. 11 illustrates an example of a computer system corresponding to, including, or included within the system of FIG. 2 according to particular implementations.

FIG. 11 illustrates an example of a computer system 1100 corresponding to the system of FIG. 2 according to particular implementations. For example, the computer system 1100 is configured to initiate, perform, or control one or more of the operations described with reference to any of FIGS. 1-10. The computer system 1100 can be implemented as or incorporated into one or more of various other devices, such as a personal computer (PC), a tablet PC, a server computer, a personal digital assistant (PDA), a laptop computer, a desktop computer, a communications device, a wireless telephone, or any other machine capable of executing a set of instructions (sequential or otherwise) that specify actions to be taken by that machine. Further, while a single computer system 1100 is illustrated, the term "system" includes any collection of systems or sub-systems that individually or jointly execute a set, or multiple sets, of instructions to perform one or more computer functions.

While FIG. 11 illustrates one example of the computer system 1100, other computer systems or computing architectures and configurations may be used for carrying out the automated model generation or asset monitoring operations disclosed herein. The computer system 1100 includes the one or more processors 220. Each processor of the one or more processors 220 can include a single processing core or multiple processing cores that operate sequentially, in parallel, or sequentially at times and in parallel at other times. Each processor of the one or more processors 220 includes circuitry defining a plurality of logic circuits 1102, working memory 1104 (e.g., registers and cache memory), communication circuits, etc., which together enable the processor(s) 220 to control the operations performed by the computer system 1100 and enable the processor(s) 220 to generate a useful result based on analysis of particular data and execution of specific instructions.

The processor(s) 220 are configured to interact with other components or subsystems of the computer system 1100 via a bus 1160. The bus 1160 is illustrative of any interconnection scheme serving to link the subsystems of the computer system 1100, external subsystems or devices, or any combination thereof. The bus 1160 includes a plurality of conductors to facilitate communication of electrical and/or electromagnetic signals between the components or subsystems of the computer system 1100. Additionally, the bus 1160 includes one or more bus controllers or other circuits (e.g., transmitters and receivers) that manage signaling via the plurality of conductors and that cause signals sent via the plurality of conductors to conform to particular communication protocols.

The computer system 1100 also includes the one or more memory devices 1142. The memory device(s) 1142 include any suitable computer-readable storage device depending on, for example, whether data access needs to be bi-directional or unidirectional, speed of data access required, memory capacity required, other factors related to data access, or any combination thereof. Generally, the memory device(s) 1142 includes some combinations of volatile memory devices and non-volatile memory devices, though in some implementations, only one or the other may be present. Examples of volatile memory devices and circuits include registers, caches, latches, many types of random-access memory (RAM), such as dynamic random-access memory (DRAM), etc. Examples of non-volatile memory devices and circuits include hard disks, optical disks, flash memory, and certain type of RAM, such as resistive random-access memory (ReRAM). Other examples of both volatile and non-volatile memory devices can be used as well, or in the alternative, so long as such memory devices store information in a physical, tangible medium. Thus, the memory device(s) 1142 include circuits and structures and are not merely signals or other transitory phenomena (i.e., the memory device(s) are non-transitory media).

In the example illustrated in FIG. 11, the memory device(s) 1142 store the instructions 232 that are executable by the processor(s) 220 to perform various operations and functions. The instructions 232 include instructions to enable the various components and subsystems of the computer system 1100 to operate, interact with one another, and interact with a user, such as a basic input/output system (BIOS) 1152 and an operating system (OS) 1154. Additionally, the instructions 232 include one or more applications 1156, scripts, or other program code to enable the processor(s) 220 to perform the operations described herein. For example, in FIG. 11, the instructions 232 include automated model building instructions 1162 configured to initiate, control, or perform one or more model generation or model training operations. Additionally, in the example of FIG. 11, the instructions include an anomaly detection engine 1158 that is configured to execute one or more models 1162 and preprocessors 222 to detect or predict abnormal behavior of a monitored asset. In FIG. 11, the models 1162 include the behavior model 108, the state predictor 112, and the classifier model 126.

In FIG. 11, the computer system 1100 also includes one or more output devices 1130, one or more input devices 1120, and one or more interface devices 1132. Each of the output device(s) 1130, the input device(s) 1120, and the interface device(s) 1132 can be coupled to the bus 1160 via a port or connector, such as a Universal Serial Bus port, a digital visual interface (DVI) port, a serial ATA (SATA) port, a small computer system interface (SCSI) port, a high-definition media interface (HDMI) port, or another serial or parallel port. In some implementations, one or more of the output device(s) 1130, the input device(s) 1120, the interface device(s) 1132 is coupled to or integrated within a housing with the processor(s) 220 and the memory device(s) 1142, in which case the connections to the bus 1160 can be internal, such as via an expansion slot or other card-to-card connector. In other implementations, the processor(s) 220 and the memory device(s) 1142 are integrated within a housing that includes one or more external ports, and one or more of the output device(s) 1130, the input device(s) 1120, the interface device(s) 1132 is coupled to the bus 1160 via the external port(s).

Examples of the output device(s) 1130 include display devices (e.g., the display device 262 of FIG. 2), speakers, printers, televisions, projectors, or other devices to provide output of data in a manner that is perceptible by a user. Examples of the input device(s) 1120 include buttons, switches, knobs, a keyboard 1122, a pointing device 1124, a biometric device, a microphone, a motion sensor, or another device to detect user input actions. The pointing device 1124 includes, for example, one or more of a mouse, a stylus, a track ball, a pen, a touch pad, a touch screen, a tablet, another device that is useful for interacting with a graphical user interface, or any combination thereof. A particular device may be an input device 1120 and an output device 1130. For example, the particular device may be a touch screen.

The interface device(s) 1132 are configured to enable the computer system 1100 to communicate with one or more other devices 1144 directly or via one or more networks 1140. For example, the interface device(s) 1132 may encode data in electrical and/or electromagnetic signals that are transmitted to the other device(s) 1144 as control signals or packet-based communication using pre-defined communication protocols. As another example, the interface device(s) 1132 may receive and decode electrical and/or electromagnetic signals that are transmitted by the other device(s) 1144. To illustrate, the other device(s) 1144 may include the sensor(s) 240 of FIG. 2. The electrical and/or electromagnetic signals can be transmitted wirelessly (e.g., via propagation through free space), via one or more wires, cables, optical fibers, or via a combination of wired and wireless transmission.

In an alternative embodiment, dedicated hardware implementations, such as application specific integrated circuits, programmable logic arrays and other hardware devices, can be constructed to implement one or more of the operations described herein. Accordingly, the present disclosure encompasses software, firmware, and hardware implementations.

The systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, AWK, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like.

The systems and methods of the present disclosure may be embodied as a customization of an existing system, an add-on product, a processing apparatus executing upgraded software, a standalone system, a distributed system, a method, a data processing system, a device for data processing, and/or a computer program product. Accordingly, any portion of the system or a module or a decision model may take the form of a processing apparatus executing code, an internet based (e.g., cloud computing) embodiment, an entirely hardware embodiment, or an embodiment combining aspects of the internet, software and hardware. Furthermore, the system may take the form of a computer program product on a computer-readable storage medium or device having computer-readable program code (e.g., instructions) embodied or stored in the storage medium or device. Any suitable computer-readable storage medium or device may be utilized, including hard disks, CD-ROM, optical storage devices, magnetic storage devices, and/or other storage media. As used herein, a "computer-readable storage medium" or "computer-readable storage device" is not a signal.

Systems and methods may be described herein with reference to screen shots, block diagrams and flowchart illustrations of methods, apparatuses (e.g., systems), and computer media according to various aspects. It will be understood that each functional block of block diagrams and flowchart illustrations, and combinations of functional blocks in block diagrams and flowchart illustrations, respectively, can be implemented by computer program instructions.

Computer program instructions may be loaded onto a computer or other programmable data processing apparatus to produce a machine, such that the instructions that execute on the computer or other programmable data processing apparatus create means for implementing the functions specified in the flowchart block or blocks. These computer program instructions may also be stored in a computer-readable memory or device that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Particular aspects of the disclosure are described below in the following clauses:

According to Clause 1, a method includes: providing behavior model input data to a behavior model to generate behavior model output data; generating an initial state prediction based on the behavior model output data; based on the initial state prediction indicating a particular state, generating state prediction statistics, the state prediction statistics based on the initial state prediction and historical state predictions indicating the particular state; and providing classifier input data to a classifier model to generate a classification output indicating whether the initial state prediction is reliable, the classifier input data generated based on the state prediction statistics.

Clause 2 includes the method of Clause 1, wherein the behavior model is configured to generate an alert responsive to detecting a change of operating state, and wherein the initial state prediction is generated responsive to detecting the change of operating state.

Clause 3 includes the method of Clause 1 or Clause 2, wherein the behavior model includes or corresponds to an autoencoder.

Clause 4 includes the method of any of Clauses 1 to 3, wherein the initial state prediction is based on reconstruction residuals of an autoencoder responsive to the behavior model input data.

Clause 5 includes the method of any of Clauses 1 to 4, wherein the behavior model output data includes one or more risk values, and the method further includes providing alert model input data, based on the one or more risk values, to an alert model to generate the initial state prediction as alert model output data, wherein the initial state prediction indicates whether the behavior model input data is predicted to indicate abnormal behavior of a monitored system.

Clause 6 includes the method of Clause 5, wherein the classifier input data is provided to the classifier model based on the initial state prediction from the alert model indicating abnormal behavior.

Clause 7 includes the method of any of Clauses 1 to 6, wherein the behavior model input data is based on sensor data from a monitored system.

Clause 8 includes the method of Clause 7, wherein the monitored system includes a drilling rig.

Clause 9 includes the method of Clause 7, wherein the monitored system includes a vehicle.

Clause 10 includes the method of any of Clauses 1 to 9, wherein the state prediction statistics are not generated when the initial state prediction indicates a second particular state that is distinct from the particular state.

Clause 11 includes the method of Clause 10, wherein the particular state is associated with abnormal behavior and the second particular state is associated with normal behavior.

Clause 12 includes the method of any of Clauses 1 to 11, wherein the classifier model is trained to reduce a false positive rate associated with initial state predictions indicating abnormal behavior.

Clause 13 includes the method of any of Clauses 1 to 12, wherein the state prediction statistics include a duration of a period in which the initial state prediction indicates an alert condition.

Clause 14 includes the method of any of Clauses 1 to 13, wherein the state prediction statistics include an average risk score value during a period in which the initial state prediction indicates an alert condition.

Clause 15 includes the method of any of Clauses 1 to 14, wherein the state prediction statistics include a metric indicating variation of a risk score from an average risk score value during a period in which the initial state prediction indicates an alert condition.

Clause 16 includes the method of any of Clauses 1 to 15, wherein the state prediction statistics include a metric indicating a quantile value of a risk score during a period in which the initial state prediction indicates an alert condition.

Clause 17 includes the method of any of Clauses 1 to 16, wherein the state prediction statistics include a metric indicating a rate of change of a risk score during a period in which the initial state prediction indicates an alert condition.

Clause 18 includes the method of any of Clauses 1 to 17, wherein the state prediction statistics include a metric indicating a number of prior alert conditions during a specified time window preceding a period in which the initial state prediction indicates an alert condition.

Clause 19 includes the method of any of Clauses 1 to 18, wherein the state prediction statistics include a metric indicating an average risk score value during a specified time window preceding a period in which the initial state prediction indicates an alert condition.

Clause 20 includes the method of any of Clauses 1 to 19, wherein the state prediction statistics include a metric indicating variation of a risk score from an average risk score value during a specified time window preceding a period in which the initial state prediction indicates an alert condition.

Clause 21 includes the method of any of Clauses 1 to 20, wherein the state prediction statistics include a metric indicating a rate of change of a risk score during a specified time window preceding a period in which the initial state prediction indicates an alert condition.

Clause 22 includes the method of any of Clauses 1 to 21, wherein the behavior model input data is based on a particular time window of multivariate time series data.

Clause 23 includes the method of any of Clauses 1 to 22, wherein the behavior model input data is based on sensor data values.

Clause 24 includes the method of Clause 23, wherein the sensor data values indicate measurements of one or more of a mechanical load, a rotation rate, a torque, a position, a pressure, or a flow rate.

Clause 25 includes the method of any of Clauses 1 to 24, wherein the behavior model input data is based on sensor data value statistics.

Clause 26 includes the method of Clause 25, wherein the sensor data value statistics include a change metric indicative of change of a sensor data value during a particular time interval.

Clause 27 includes the method of Clause 25 or Clause 26, wherein the sensor data value statistics include an average of a sensor data value during a particular time interval.

Clause 28 includes the method of any of Clauses 25 to 27, wherein the sensor data value statistics include a variation metric indicative of variation from an average sensor data value during a particular time interval.

Clause 29 includes the method of any of Clauses 25 to 28, wherein the sensor data value statistics include a maximum change of a sensor data value during a particular time interval.

Clause 30 includes the method of any of Clauses 25 to 29, wherein the sensor data value statistics are determined based on a plurality of distinct time scales.

Clause 31 includes the method of any of Clauses 1 to 30, wherein state prediction statistics are based on time-based windowing of the historical state predictions.

Clause 32 includes the method of any of Clauses 1 to 30, wherein state prediction statistics are based on non-time-based windowing of the historical state predictions.

Clause 33 includes the method of any of Clauses 1 to 30, wherein state prediction statistics are based on depth-based windowing of the historical state predictions.

Clause 34 includes the method of any of Clauses 1 to 33, further including generating a display based on the classification output, the initial state prediction, or both.

Clause 35 includes the method of any of Clauses 1 to 34, further including sending an alert notification based on the classification output, the initial state prediction, or both.

Clause 36 includes the method of any of Clauses 1 to 35, further including generating a control signal to modify operation of a monitored device based on the classification output, the initial state prediction, or both.

Clause 37 includes the method of any of Clauses 1 to 36, wherein the classifier model is an XGBoost model.

Clause 38 includes the method of any of Clauses 1 to 37, wherein the behavior model input data is based on a first set of values of sensor data for a monitored system; wherein the behavior model output data includes a predicted set of values; and wherein the initial state prediction is based on how closely the predicted set of values match corresponding sensor data values for the monitored system.

Clause 39 includes the method of Clause 38, wherein the monitored system includes a drilling rig and wherein the initial state prediction predicts a stuck pipe condition based on a result of a comparison of the predicted set of values and the corresponding sensor data values.

Clause 40 includes a device including one or more processors configured to execute instructions to perform the method of any of clauses 1-39.

Clause 41 includes a non-transitory computer readable medium storing instructions that are executable by one or more processors to perform the method of any of clauses 1-39.

Although the disclosure may include one or more methods, it is contemplated that it may be embodied as computer program instructions on a tangible computer-readable medium, such as a magnetic or optical memory or a magnetic or optical disk/disc. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:

providing behavior model input data to a behavior model to generate behavior model output data, wherein the behavior model input data is based on sensor data from a monitored system;

generating an initial state prediction based on the behavior model output data;

based on the initial state prediction indicating a particular state of the monitored system, generating state prediction statistics, the state prediction statistics based on the initial state prediction and historical state predictions indicating the particular state; and providing classifier input data to a classifier model to generate a classification output indicating whether the initial state prediction is reliable to mitigate false positives or false negatives associated with an alert condition related to the monitored system, the classifier input data generated based on the state prediction statistics.

2. The method of claim 1, wherein the behavior model is configured to generate an alert responsive to detecting a change of operating state, and wherein the initial state prediction is generated responsive to detecting the change of operating state.

3. The method of claim 1, wherein the initial state prediction is based on reconstruction residuals of an auto-encoder responsive to the behavior model input data.

4. The method of claim 1, wherein the behavior model output data includes one or more risk values, and further comprising providing alert model input data, based on the one or more risk values, to an alert model to generate the initial state prediction as alert model output data, wherein the initial state prediction indicates whether the behavior model input data is predicted to indicate abnormal behavior of the monitored system.

5. The method of claim 4, wherein the classifier input data is provided to the classifier model based on the initial state prediction from the alert model indicating the abnormal behavior.

6. The method of claim 1, wherein the state prediction statistics include an average risk score value during a period.

7. The method of claim 1, wherein the state prediction statistics are not generated when the initial state prediction indicates a second particular state that is distinct from the particular state.

8. The method of claim 7, wherein the particular state is associated with abnormal behavior and the second particular state is associated with normal behavior.

9. The method of claim 1, wherein the sensor data indicates measurements of one or more of a mechanical load, a rotation rate, a torque, a position, a pressure, or a flow rate.

10. The method of claim 1, wherein the state prediction statistics are based on time-based windowing of the historical state predictions.

11. The method of claim 1, wherein the state prediction statistics are based on non-time-based windowing of the historical state predictions.

12. The method of claim 1, wherein the state prediction statistics are based on depth-based windowing of the historical state predictions.

13. The method of claim 1, further comprising generating a control signal to modify operation of a monitored device based on the classification output, the initial state prediction, or both.

14. The method of claim 1, wherein:

the behavior model input data is based on a first set of values of the sensor data for the monitored system that includes a drilling rig;

the behavior model output data includes a predicted set of values; and the initial state prediction predicts risk of a stuck pipe condition based on a result of a comparison of the predicted set of values and corresponding sensor data values.

15. A device comprising one or more processors configured to execute instructions to:

provide behavior model input data to a behavior model to generate behavior model output data, wherein the behavior model input data is based on sensor data from a monitored system;

generate an initial state prediction based on the behavior model output data;

based on the initial state prediction indicating a particular state of the monitored system, generate state prediction statistics, the state prediction statistics based on the initial state prediction and historical state predictions indicating the particular state; and provide classifier input data to a classifier model to generate a classification output indicating whether the initial state prediction is reliable to mitigate false positives or false negatives associated with an alert condition related to the monitored system, the classifier input data generated based on the state prediction statistics.

16. The device of claim 15, wherein:

the behavior model input data is based on a first set of values of the sensor data for the monitored system that includes a drilling rig;

the behavior model output data includes a predicted set of values; and the initial state prediction predicts risk of a stuck pipe condition based on a result of a comparison of the predicted set of values and corresponding sensor data values.

17. The device of claim 15, wherein the behavior model output data includes one or more risk values, and the one or more processors are further configured to provide alert model input data, based on the one or more risk values, to an alert model to generate the initial state prediction as alert model output data, wherein the initial state prediction indicates whether the behavior model input data is predicted to indicate abnormal behavior of the monitored system.

18. A non-transitory computer readable medium storing instructions that are executable by one or more processors to perform operations including:

providing behavior model input data to a behavior model to generate behavior model output data, wherein the behavior model input data is based on sensor data from a monitored system;

generating an initial state prediction based on the behavior model output data;

based on the initial state prediction indicating a particular state of the monitored system, generating state prediction statistics, the state prediction statistics based on the initial state prediction and historical state predictions indicating the particular state; and providing classifier input data to a classifier model to generate a classification output indicating whether the initial state prediction is reliable to mitigate false positives or false negatives associated with an alert condition related to the monitored system, the classifier input data generated based on the state prediction statistics.

19. The non-transitory computer readable medium of claim 18, wherein the particular state is associated with abnormal behavior, and wherein the state prediction statistics are not generated when the initial state prediction indicates a second particular state that is associated with normal behavior.

20. The non-transitory computer readable medium of claim 18, wherein the behavior model input data is based on sensor data values, wherein the sensor data values indicate measurements of one or more of a mechanical load, a rotation rate, a torque, a position, a pressure, or a flow rate.

* * * * *